(12) United States Patent
Lee

(10) Patent No.: US 12,518,835 B2
(45) Date of Patent: Jan. 6, 2026

(54) NONVOLATILE MEMORY DEVICE AND METHOD OF CONTROLLING READ OPERATION OF THE SAME

(71) Applicant: SAMSUNG ELECTRONICS CO., LTD., Suwon-si (KR)

(72) Inventor: Taeyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 301 days.

(21) Appl. No.: 18/099,808

(22) Filed: Jan. 20, 2023

(65) Prior Publication Data

US 2023/0420058 A1 Dec. 28, 2023

(30) Foreign Application Priority Data

Jun. 28, 2022 (KR) .................. 10-2022-0078644

(51) Int. Cl.
*G11C 16/26* (2006.01)
*G11C 16/24* (2006.01)

(52) U.S. Cl.
CPC ............... *G11C 16/24* (2013.01); *G11C 16/26* (2013.01)

(58) Field of Classification Search
CPC .......... G11C 16/24; G11C 16/26; G11C 7/12; G11C 16/0483; G11C 7/06; H10B 41/41
USPC .................................................. 365/185.25
See application file for complete search history.

(56) References Cited

U.S. PATENT DOCUMENTS

| 5,412,606 A | 5/1995 | Lee |
| 6,490,199 B2 | 12/2002 | Lee et al. |
| 8,050,104 B2 | 11/2011 | Byeon |
| 8,243,530 B2 | 8/2012 | Kang et al. |
| 9,136,006 B2 | 9/2015 | Hung et al. |
| 9,589,610 B1 * | 3/2017 | Chen ................. G11C 7/12 |
| 9,598,610 B2 * | 3/2017 | Hilsenbeck ............ C08L 23/02 |
| 11,004,501 B2 | 5/2021 | Chen |
| 2019/0019561 A1 * | 1/2019 | Lee ....................... G11C 16/26 |
| 2021/0375339 A1 | 12/2021 | Lien et al. |

(Continued)

FOREIGN PATENT DOCUMENTS

CN 108615541 A 10/2018

OTHER PUBLICATIONS

Baliga, "Fundamentals of Power Semiconductor Devices", Springer, Jan. 1, 2008, pp. 465-466.

(Continued)

*Primary Examiner* — Amir Zarabian
(74) *Attorney, Agent, or Firm* — Sughrue Mion, PLLC

(57) ABSTRACT

A nonvolatile memory device is provided. The nonvolatile memory device includes: a bitline; a precharge transistor configured to electrically connect the bitline to a power supply voltage during a precharge period of a read operation to transmit a bitline current flowing from the power supply voltage to the bitline; a cell string connected between the bitline and a source line, the cell string including a plurality of memory cells and being configured to transmit a first portion of the bitline current as a cell current; and a current control switch circuit connected between the bitline and a sink node, the current control switch circuit being configured to transmit a second portion of the bitline current as a control current flowing from the bitline to the sink node during the precharge period.

20 Claims, 29 Drawing Sheets

(56) References Cited

U.S. PATENT DOCUMENTS

2022/0052066 A1  2/2022  Kim

OTHER PUBLICATIONS

Extended European Search Report dated Oct. 17, 2023, issued by European Patent Office in European Patent Application No. 23163785.1.

* cited by examiner

NONVOLATILE MEMORY DEVICE AND METHOD OF CONTROLLING READ OPERATION OF THE SAME

CROSS-REFERENCE TO RELATED APPLICATION

This application claims priority under to Korean Patent Application No. 10-2022-0078644, filed on Jun. 28, 2022, in the Korean Intellectual Property Office, the disclosure of which is incorporated by reference herein in its entirety.

BACKGROUND

1. Field

Example embodiments relate generally to semiconductor integrated circuits, and more particularly to a nonvolatile memory device and a method of controlling a read operation of the same.

2. Discussion of Related Art

A flash memory device, a resistive memory device, etc., can store data in accordance with a plurality of threshold voltage distributions or a plurality of resistance distributions, where each respective distribution is assigned to a corresponding logic state for stored data. The data stored by a memory cell may be read by determining whether the memory cell is turned on or off when a predetermined read voltage is applied. During a read operation, a precharge operation may be performed by applying a predetermined voltage or current to bitlines. A precharge time may be increased due to coupling noises between the bitlines while a bitline current is generated for the precharge operation.

SUMMARY

One or more example embodiments provide a nonvolatile memory device and a method of controlling a read operation of the nonvolatile memory device, capable of reducing a precharge time.

According to example embodiments, a nonvolatile memory device includes: a bitline; a precharge transistor configured to electrically connect the bitline to a power supply voltage during a precharge period of a read operation to transmit a bitline current flowing from the power supply voltage to the bitline; a cell string connected between the bitline and a source line, the cell string including a plurality of memory cells and being configured to transmit a first portion of the bitline current as a cell current; and a current control switch circuit connected between the bitline and a sink node, the current control switch circuit being configured to transmit a second portion of the bitline current as a control current flowing from the bitline to the sink node during the precharge period.

According to example embodiments, a method of controlling a read operation of a nonvolatile memory device, includes: controlling a bitline current to flow from a power supply voltage to a bitline by electrically connecting the bitline to the power supply voltage during a precharge period of the read operation; controlling a first portion of the bitline current, as a cell current, to flow through a cell string connected between the bitline and a source line during the precharge period; controlling a second portion of the bitline current, as a control current, to flow through a current control switch circuit connected between the bitline and a sink node during the precharge period; electrically connecting the bitline to a sensing node during a develop period after the precharge period; and sensing data stored in a selected memory cell of the cell string using a sense amplifier connected to the sensing node during a sensing period after the develop period.

According to example embodiments, a nonvolatile memory device includes: a plurality of bitlines; a plurality of precharge transistors configured to electrically connect the plurality of bitlines to a power supply voltage during a precharge period of a read operation to transmit a plurality of bitline currents respectively flowing from the power supply voltage to the plurality of bitlines; a plurality of cell strings respectively connected between the plurality of bitlines and a source line, the plurality of cell strings respectively including a plurality of memory cells and being configured to respectively transmit, respectively, first portions of the plurality of bitline currents as a plurality of cell currents; and a plurality of current control switch circuits respectively connected between the plurality of bitlines and a sink node, the plurality of current control switch circuits being configured to respectively transmit, respectively, second portions of the plurality of bitline currents, as a plurality of control currents flowing from the plurality of bitlines to the sink node during the precharge period.

The nonvolatile memory device and the method according to example embodiments may reduce the precharge time by generating the control current flowing from the bitline to the sink node to increase the bitline current. The precharge time may be reduced without an additional operation to determine whether the selected memory cell is an on cell or an off cell by generating the control current to all of the bitlines.

In addition, the nonvolatile memory device and the method according to example embodiments may reduce the develop time for which the sensing node is discharged, by increasing the bitline current. The control current may be changed during the precharge period based on factors of affecting the cell current such as the temperature and the position of the selected memory cell, and the develop time may be adjusted to decrease the deviation of the bitline current.

The entire read time may be reduced and the performance of the nonvolatile memory device may be enhanced by reducing the precharge time and the develop time. In addition, the performance deviation of the nonvolatile memory device may be reduced by reducing the deviation of the bitline current.

BRIEF DESCRIPTION OF DRAWINGS

The above and other aspects and features will be more apparent from the following description of example embodiments, taken in conjunction with the accompanying drawings, in which.

DETAILED DESCRIPTION

Hereinafter, example embodiments will be described with reference to the accompanying drawings. Embodiments described herein are provided as examples, and thus, the present disclosure is not limited thereto, and may be realized in various other forms. Each example embodiment provided in the following description is not excluded from being associated with one or more features of another example or another example embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
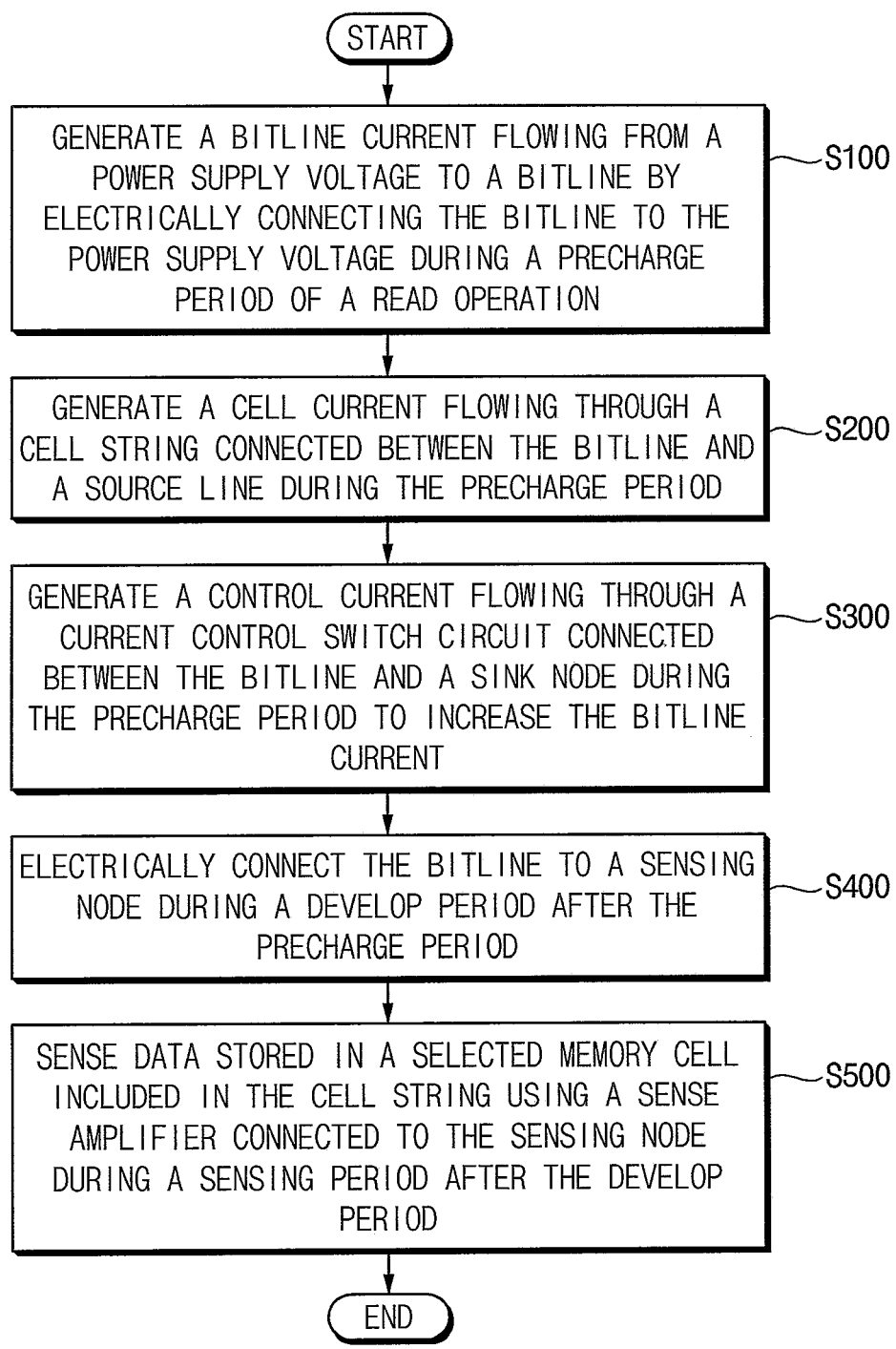
FIG. 1 is a flow chart illustrating a method of controlling a read operation of a nonvolatile memory device according to example embodiments.
Figure 2:
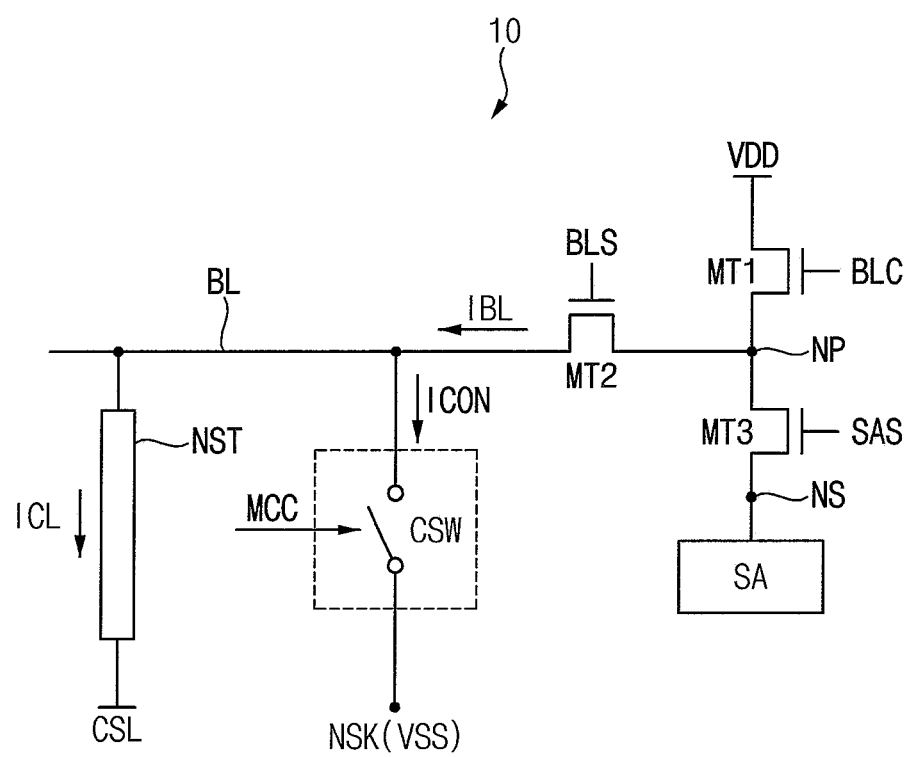
FIG. 2 is a conceptual diagram illustrating a nonvolatile memory device according to example embodiments.

FIG. 1 is a flow chart illustrating a method of controlling a read operation of a nonvolatile memory device according to example embodiments, and FIG. 2 is a conceptual diagram illustrating a nonvolatile memory device according to example embodiments.

FIG. 1 illustrates a method corresponding to on one bitline and FIG. 2 illustrates a configuration corresponding to one bitline. As will be described below with reference to FIGS. 3, 4 and 5, a nonvolatile memory device may include a plurality of bitlines and the method of FIG. 1 and the configuration of FIG. 2 may be applied to each of the plurality of bitlines.

Referring to FIG. 1, a bitline current flowing from a power supply voltage (e.g., a node to which the power supply voltage is applied) to a bitline may be generated by electrically connecting the bitline to the power supply voltage during a precharge period of a read operation (S100).

A cell current flowing through a cell string connected between the bitline and a source line may be generated during the precharge period (S200).

A control current flowing through a current control switch circuit connected between the bitline and a sink node may be generated during the precharge period to increase the bitline current (S300).

The bitline may be electrically connected to a sensing node during a develop period after the precharge period (S400).

Data stored in a selected memory cell included in the cell string may be sensed using a sense amplifier connected to the sensing node during a sensing period after the develop period (S500).

Referring to FIG. 2, a nonvolatile memory device 10 may include a bitline BL, a precharge transistor MT1, a bitline selection transistor MT2, a sensing transistor MT3, a cell string NST, a current control switch circuit CSW and a sense amplifier SA. For convenience of illustration and description, FIG. 2 illustrates one cell string NST connected to the bitline BL, and a plurality of cell strings may be connected to the bitline BL as will be described below with reference to FIG. 5.

The precharge transistor MT1 may be connected between a power supply voltage VDD and a precharge node NP, and may be turned on based on a precharge signal BLC applied to a gate electrode of the precharge transistor MT1 to electrically connect the power supply voltage VDD and the precharge node NP. The precharge transistor MT1 may be turned on during a precharge period of a read operation to generate a bitline current IBL flowing from the power supply voltage VDD to the bitline BL.

The bitline selection transistor MT2 may be connected between the precharge node NP and the bitline BL, and may be turned on based on a bitline selection signal BLS applied to a gate electrode of the bitline selection transistor MT2 to electrically connect the precharge node NP and the bitline BL. The bitline selection transistor MT2 may be turned on during the precharge period to electrically connect the precharge node NP and the bitline BL.

The develop transistor MT3 may be connected between the precharge node NP and a sensing node NS, and may be turned on based on a develop signal SAS applied to a gate electrode of the develop transistor MT3 to electrically connect the precharge node NP and the sensing node NS. The develop transistor MT3 may be turned on during a develop period after the precharge period to electrically connect the precharge node NP and the sensing node NS. The bitline selection transistor MT2 may be turned on during the develop period and thus the bitline BL may be electrically connected to the sensing node NS during the develop period.

The cell string NST may include a plurality of memory cells connected between the bitline BL and the source line CSL as will be described below with reference to FIG. 5. The cell string NST may generate a cell current ICL based on the bitline current IBL during the precharge period.

During the read operation, a selected memory cell may be selected among the plurality of memory cells in the cell string NST based on a read address. A read voltage may be applied to the selected memory cell and a pass voltage may be applied to the other memory cells. The selected memory cell may be turned off when a threshold voltage of the selected memory cell is higher than the read voltage, and in this case the selected memory cell may be referred to as an off cell. In contrast, the selected memory cell may be turned on when the threshold voltage of the selected memory cell is lower than the read voltage, and in this case the selected memory cell may be referred to as an on cell. The cell current ICL may be relatively small in case of the off cell, and the cell current ICL may be relatively large in case of the on cell.

The current control switch circuit CSW may generate the control current ICON during the precharge period, regardless of whether the selected memory cell is the on cell or the off cell. In this regard, during the precharge period, a plurality of control currents ICON corresponding to a plurality of bitlines BL, regardless of whether each selected memory cell corresponding to each bitline BL is the on cell or the off cell.

The current control switch circuit CSW may be connected between the bitline BL and the sink node NSK, and may generate the control current ICON flowing from the bitline BL to the sink node NSK during the precharge period to increase the bitline current IBL. In some example embodiments, the sink node NSK may be a node to which a ground voltage VSS is applied during the read operation. According to the law of Kirchhoff, the bitline current IBL corresponds to the sum of the cell current ICL and the control current ICON, and thus the bitline current IBL may be increased by generating the control current ICON. As will be described below with reference to FIGS. 10A, 10B, 11A and 11B, the precharge time may be reduced by increasing the bitline current IBL.

The current control switch circuit CSW may control the magnitude of the control current ICON based on a current control signal MCC. The magnitude of the control current ICON may be set according to the operation conditions and the operation characteristics of the nonvolatile memory device 10. The proper magnitude of the control current ICON may be determined based on measured values during tests of the nonvolatile memory device 10, or based on simulation results.

The sense amplifier SA may be connected to the sensing node NS and the data stored in the selected memory cell may be sensed using the sense amplifier SA. An example embodiment of the sense amplifier SA will be described below with reference to FIG. 8.

As such, the nonvolatile memory device 10 and the method according to example embodiments may reduce the precharge time by generating the control current ICON flowing from the bitline BL to the sink node NSK to increase the bitline current IBL. The precharge time may be reduced without an additional operation to determine whether the selected memory cell is an on cell or an off cell, for example, by generating the control current ICON to each of the plurality of bitlines included in the nonvolatile memory device 10.

Figure 3:
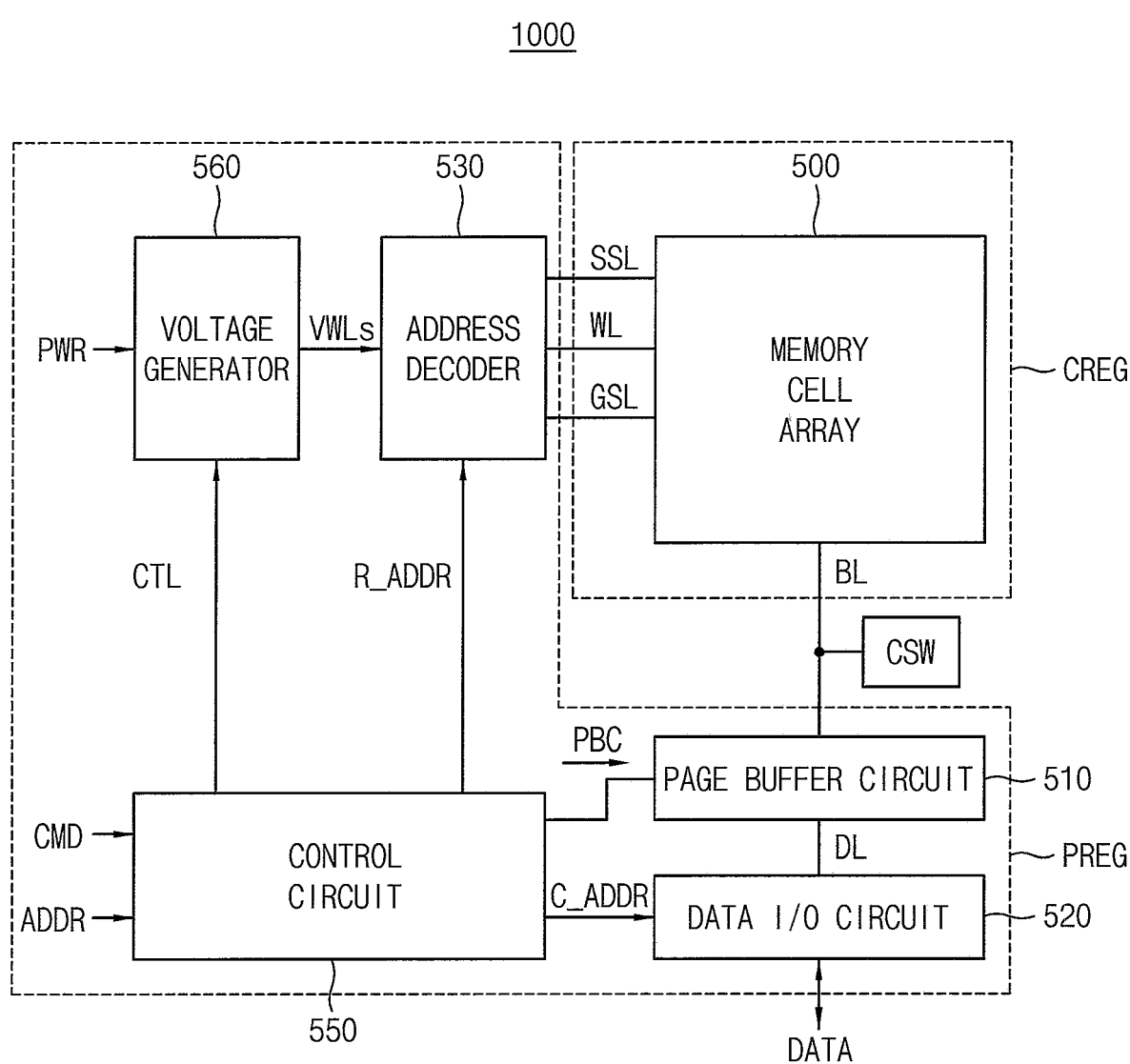
FIG. 3 is a block diagram illustrating a nonvolatile memory device according to example embodiments.

FIG. 3 is a block diagram illustrating a nonvolatile memory device according to example embodiments.

Referring to FIG. 3, the nonvolatile memory device 1000 may include a memory cell array 500, a page buffer circuit 510, a data input/output (I/O) circuit 520, an address decoder 530, a control circuit 550 and a voltage generator 560. The memory cell array 500 may be formed in the cell region CREG of FIG. 17, and the page buffer circuit 510, the data I/O circuit 520, the address decoder 530, the control circuit 550 and the voltage generator 560 may be formed in the peripheral region PREG of FIG. 17, for example.

The memory cell array 500 may be coupled to the address decoder 530 through a plurality of string selection lines SSL, a plurality of wordlines WL, and a plurality of ground selection lines GSL. In addition, the memory cell array 500 may be coupled to the page buffer circuit 510 through a plurality of bitlines BL. The memory cell array 500 may include a plurality of memory cells coupled to the plurality of wordlines WL and the plurality of bitlines BL.

According to example embodiments, a plurality of current control switch circuits CSW may be connected to the plurality of bitlines BL, respectively. As described with reference to FIGS. 1 and 2, each current control switch circuit CSW may generate the control current ICON flowing from the bitline BL to the sink node NSK during the precharge period to increase the bitline current IBL.

In some example embodiments, the memory cell array 500 may be a three-dimensional memory cell array, which is formed on a substrate in a three-dimensional structure (or a vertical structure). In this case, the memory cell array 500 may include cell strings (e.g., NAND strings) that are vertically oriented such that at least one memory cell is located over another memory cell.

The control circuit 550 may receive a command (signal) CMD and an address (signal) ADDR from a memory controller and control erase, program and read operations of the nonvolatile memory device 1000 in response to (or based on) at least one of the command signal CMD and the address signal ADDR. An erase operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 550 may generate the control signals CTL used to control the operation of the voltage generator 560, and may generate the page buffer control signal PBC for controlling the page buffer circuit 510, based on the command signal CMD, and generate the row address R_ADDR and the column address C_ADDR based on the address signal ADDR. The control circuit 550 may provide the row address R_ADDR to the address decoder 530 and provide the column address C_ADDR to the data I/O circuit 520.

The address decoder 530 may be coupled to the memory cell array 500 through the string selection lines SSL, the wordlines WL, and the ground selection lines GSL. During the program operation or the read operation, the address decoder 530 may determine (or select) one of the wordlines WL as a selected wordline and determine the remaining wordlines WL except for the selected wordline as unselected wordlines based on the row address R_ADDR.

In addition, during the program operation or the read operation, the address decoder 530 may determine one of the string selection lines SSL as a selected string selection line and determine rest of the string selection lines SSL except for the selected string selection line as unselected string selection lines based on the row address R_ADDR.

The voltage generator 560 may generate wordline voltages VWL, which are required for the operation of the memory cell array 500 of the nonvolatile memory device 1000, based on the control signals CTL. The voltage generator 560 may receive the power PWR from the memory controller. The wordline voltages VWL may be applied to the wordlines WL through the address decoder 530.

For example, during the erase operation, the voltage generator 560 may apply an erase voltage to a well and/or a common source line of a memory block and apply an erase permission voltage (e.g., a ground voltage) to all of the wordlines of the memory block or a portion of the wordlines based on an erase address. In addition, during the erase verification operation, the voltage generator 560 may apply an erase verification voltage simultaneously to all of the wordlines of the memory block or sequentially (e.g., one-by-one) to the wordlines.

For example, during the program operation, the voltage generator 560 may apply a program voltage to the selected wordline and may apply a program pass voltage to the unselected wordlines. In addition, during the program verification operation, the voltage generator 560 may apply a program verification voltage to the first wordline and may apply a verification pass voltage to the unselected wordlines.

In addition, during the normal read operation, the voltage generator 560 may apply a read voltage to the selected wordline and may apply a read pass voltage to the unselected wordlines. During the data recover read operation, the voltage generator 560 may apply the read voltage to a wordline adjacent to the selected wordline and may apply a recover read voltage to the selected wordline.

The page buffer circuit 510 may be coupled to the memory cell array 500 through the bitlines BL. The page buffer circuit 510 may include multiple buffers. In some embodiments, each buffer may be connected to only a single bitline. In other embodiments, each buffer may be connected to two or more bitlines. The page buffer circuit 510 may temporarily store data to be programmed in a selected page or data read out from the selected page of the memory cell array 500.

The data I/O circuit 520 may be coupled to the page buffer circuit 510 through data lines DL. During the program operation, the data I/O circuit 520 may receive program data DATA received from the memory controller and provide the program data DATA to the page buffer circuit 510 based on the column address C_ADDR received from the control circuit 550. During the read operation, the data I/O circuit 520 may provide read data DATA, having been read from the memory cell array 500 and stored in the page buffer circuit 510, to the memory controller based on the column address C_ADDR received from the control circuit 550.

In addition, the page buffer circuit 510 and the data I/O circuit 520 may read data from a first area of the memory cell array 500 and write this read data to a second area of the memory cell array 500 (e.g., without transmitting the data to a source external to the nonvolatile memory device 1000, such as to the memory controller). For example, the page buffer circuit 510 and the data I/O circuit 520 may perform a copy-back operation.

Hereinafter, a vertical direction D3 indicates a direction perpendicular to an upper surface of a semiconductor substrate, and a first horizontal direction D1 and a second horizontal direction D2 indicate two directions parallel to the upper surface of the semiconductor substrate. The first horizontal direction D1 and the second horizontal direction D2 may be substantially perpendicular. Here, the first horizontal direction D1 may be referred to as a first direction, the second horizontal direction D2 may be referred to as a second direction and the vertical direction D3 may be referred to as a third direction. The direction indicated by an arrow in figures and the opposite direction may be considered as the same direction.

Figure 4:
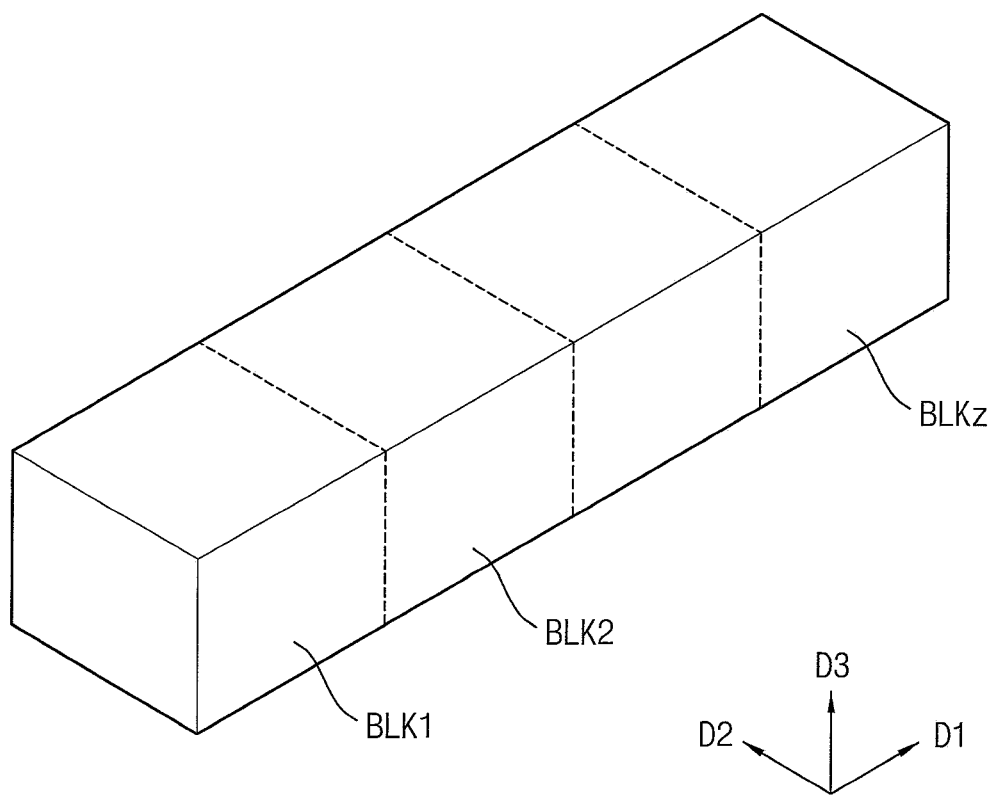
FIG. 4 is a block diagram illustrating a memory cell array included in the nonvolatile memory device of FIG. 3.
Figure 5:
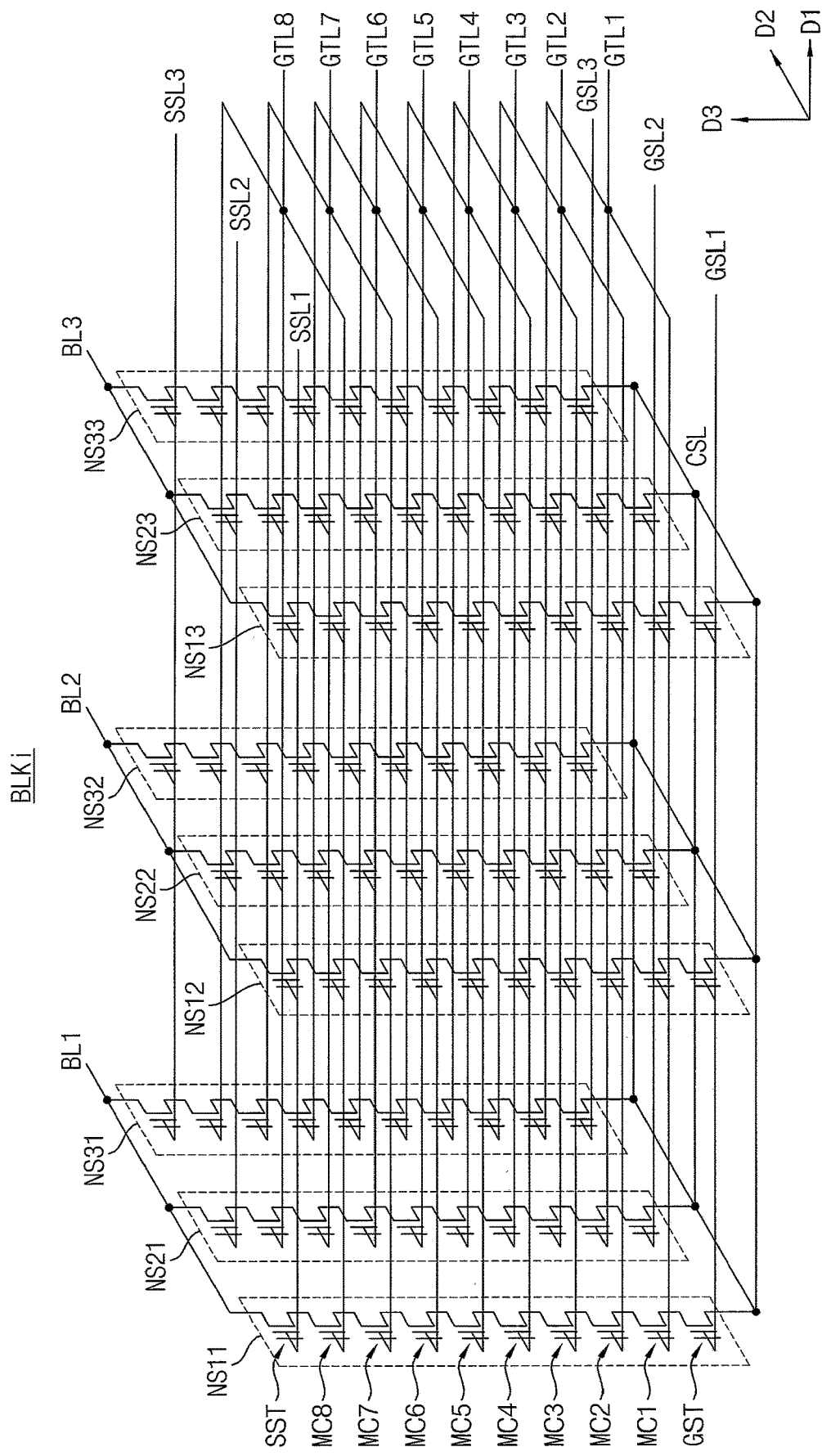
FIG. 5 is a circuit diagram illustrating an equivalent circuit of a memory block included in the memory cell array of FIG. 4.

FIG. 4 is a block diagram illustrating a memory cell array included in the nonvolatile memory device of FIG. 3, and FIG. 5 is a circuit diagram illustrating an equivalent circuit of a memory block included in the memory cell array of FIG. 4.

Referring to FIG. 4, the memory cell array 500 may include memory blocks BLK1 to BLKz. In some embodiments, the memory blocks BLK1 to BLKz may be selected by the address decoder 430 of FIG. 3. For example, the address decoder 430 may select a particular memory block BLK corresponding to a block address among the memory blocks BLK1 to BLKz.

The memory block BLKi of FIG. 5 may be formed on a substrate in a three-dimensional structure (or a vertical structure). For example, NAND strings or cell strings included in the memory block BLKi may be formed in the first horizontal direction D1 perpendicular to the upper surface of the substrate.

Referring to FIG. 5, the memory block BLKi may include NAND strings NS11 to NS33 coupled between bitlines BL1, BL2 and BL3 and a common source line CSL. Each of the NAND strings NS11 to NS33 may include a string selection transistor SST, a memory cells MC1 to MC8, and a ground selection transistor GST. In FIG. 5, each of the NAND strings NS11 to NS33 is illustrated to include eight memory cells MC1 to MC8. However, embodiments are not limited thereto. In some embodiments, each of the NAND strings NS11 to NS33 may include any number of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2 and BL3), and each ground selection transistor GST may be connected to the common source line CSL.

Wordlines (e.g., WL1) having the same height may be commonly connected, and the ground selection lines GSL1 to GSL3 and the string selection lines SSL1 to SSL3 may be separated. The gate lines corresponding to the intermediate switching lines may be separated as will be described below. In FIG. 5, the memory block BLKi is illustrated to be coupled to eight gate lines GTL1 to GTL8 and three bitlines BL1 to BL3. However, embodiments are not limited thereto. Each memory block in the memory cell array 500 may be coupled to any number of wordlines and any number of bitlines.

Figure 6A:
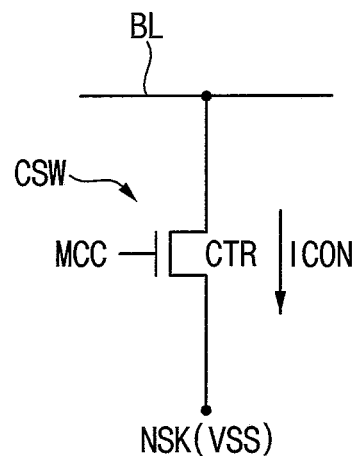
FIGS. 6A and 6B are diagrams illustrating example embodiments of a current control switch circuit included in a nonvolatile memory device according to example embodiments.
Figure 6B:
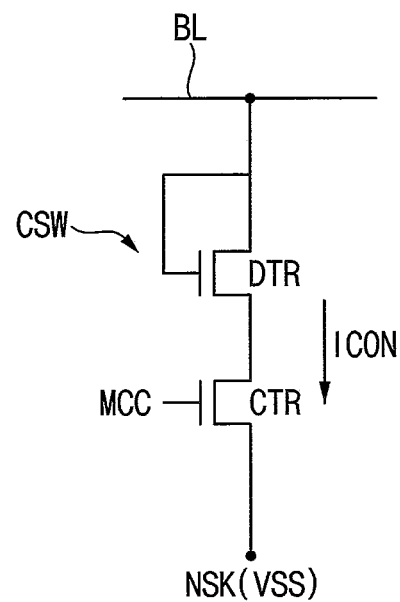

FIGS. 6A and 6B are diagrams illustrating example embodiments of a current control switch circuit included in a nonvolatile memory device according to example embodiments.

In some example embodiments, as illustrated in FIG. 6A, the current control switch circuit CSW may include an N-type metal oxide semiconductor (NMOS) transistor CTR. The NMOS transistor CTR may be connected between the bitline BL and the sink node NSK, and may receive a current control signal applied to a gate electrode of the NMOS transistor CTR to control the magnitude of the control current ICON.

In some example embodiments, as illustrated in FIG. 6B, the current control switch circuit CSW may include a first NMOS transistor DTR and a second NMOS transistor CTR. The first NMOS transistor DTR may be connected between the bitline BL and the sink node NSK, and a gate electrode and a drain electrode of the first NMOS transistor DTR may be electrically connected to each other. The second NMOS transistor CTR may be cascode-connected to the first NMOS transistor DTR between the bitline BL and the sink node NSK and the second NMOS transistor CTR may receive the current control signal applied to a gate electrode of the second NMOS transistor CTR to control a magnitude of the control current.

Figure 7A:
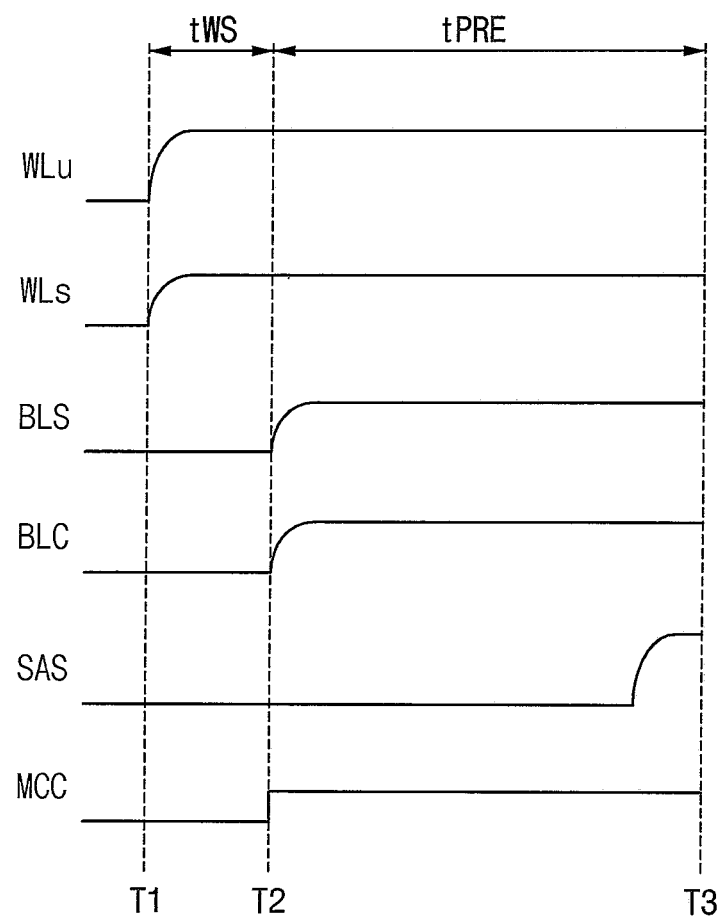
FIGS. 7A and 7B are timing diagrams illustrating example operations of a nonvolatile memory device according to example embodiments.
Figure 7B:
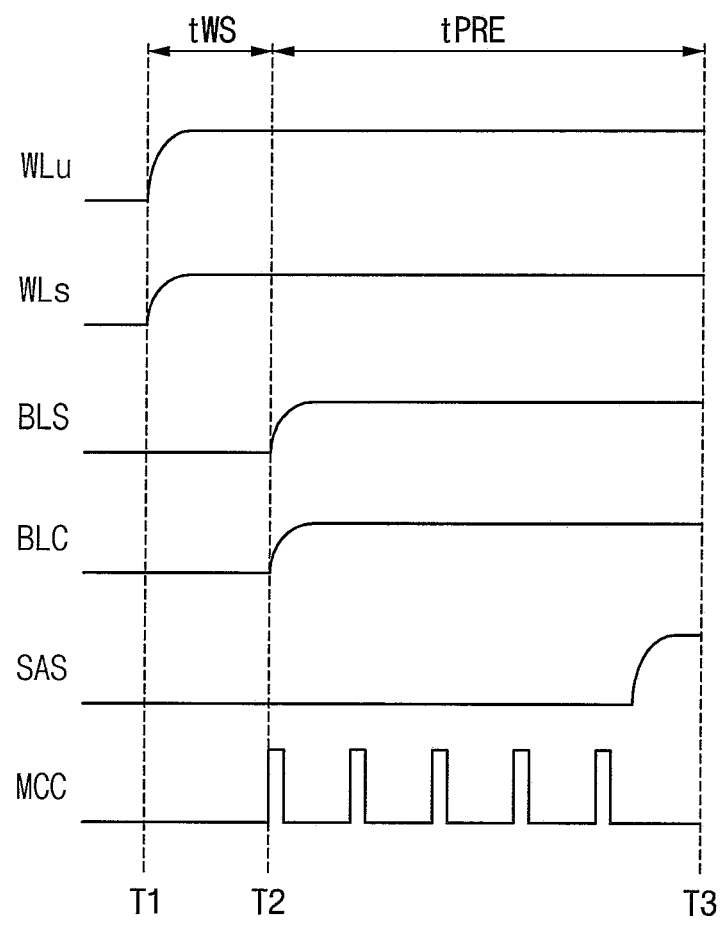

FIGS. 7A and 7B are timing diagrams illustrating example operations of a nonvolatile memory device according to example embodiments.

FIGS. 7A and 7B illustrate operations during a wordline setup period between time points T1 and T2 and a precharge period tPRE between time points T2 and T3.

Referring to FIGS. 2, 7A and 7B, at the time point T1, a read voltage may be applied to a selected wordline WLs to which a selected memory cell is connected, and a pass voltage may be applied to unselected wordlines WLu to which unselected memory cells are connected. The read voltage may have a voltage level to determine a programed state or a threshold voltage of the selected memory cell. The pass voltage may have a voltage level higher than the read voltage such that the unselected memory cells may be turned on regardless of the programmed states of the unselected memory cells.

At the time point T2, the bitline selection signal BLS and the precharge signal BLC may be activated. Accordingly the bitline selection transistor MT2 and the precharge transistor MT1 may be turned on to generate the bitline current IBL during the precharge period tPRE.

In addition, the current control signal MCC may be activated at the time point T2 to generate the control current ICON during the precharge period tPRE. As described above, the bitline current IBL may be increased by generating the control current ICON.

The develop signal SAS may be deactivated and the develop transistor MT3 may be turned off during the wordline setup period tWS and the precharge period tPRE. In some example embodiments, as illustrated in FIGS. 7A and 7B, the develop signal SAS may be activated before the end of the precharge period tPRE, according to the configuration of the sense amplifier SA.

In some example embodiments, as illustrated in FIG. 7A, the current control signal MCC may be continuously activated during the precharge period tPRE. The voltage level of the current control signal MCC may be determined through tests or simulations.

In some example embodiments, as illustrated in FIG. 7B, the current control signal MCC may be a pulse signal including pulses that are periodically activated during the precharge period tPRE. The cyclic period, the width and the voltage level of the pulses may be determined through tests or simulations.

Figure 8:
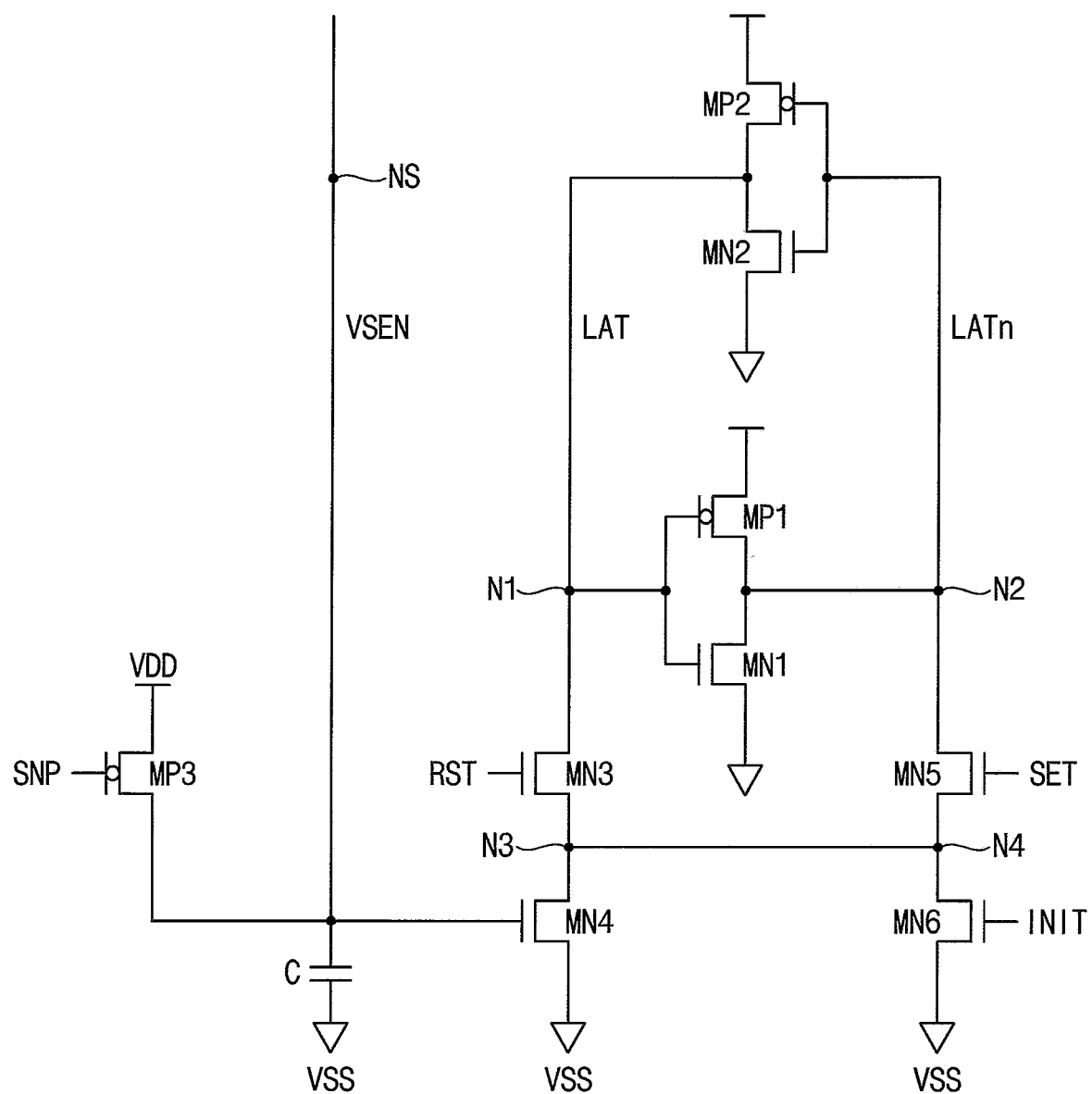
FIG. 8 is a circuit diagram illustrating a sense amplifier according to example embodiments.

FIG. 8 is a circuit diagram illustrating a sense amplifier according to example embodiments.

Referring to FIG. 8, a sense amplifier may include N-type metal oxide semiconductor (NMOS) transistors MN1~MN6 and P-type metal oxide semiconductor (PMOS) transistors MP1~MN3. The configuration is provided as an example and example embodiments are not limited thereto. The sense amplifier included in the nonvolatile memory device according to example embodiments may be implemented with various configurations.

The PMOS transistor MP1 and the NMOS transistor MN1 may form a first inverter and the PMOS transistor MP2 and the NMOS transistor MN2 may form a second inverter. The input of the first inverter MP1 and MN1 may be connected to a first node N1 and the output of the first inverter MP1 and MN1 may be connected to a second node N2. In contrast, input of the second inverter MP2 and MN2 may be connected to the second node N2 and the output of the second inverter MP2 and MN2 may be connected to the first node N1. Accordingly the first inverter MP1 and MN1 and the second inverter MP2 and MN2 may form a single latch that generates a latch signal LAT through the first node N1 and generates an inverted latch signal LATn through the second node N2.

The NMOS transistor MN3 may electrically connect the first node N1 and the third node N3 based on a reset signal RST, and the NMOS transistor MN4 may electrically connect the third node N3 and the ground voltage VSS based on a sensing voltage VSEN at the sensing node NS.

The NMOS transistor MN5 may electrically connect the second node N2 and the fourth node N4 based on a set signal SET, and the NMOS transistor MN6 may electrically connect the fourth node N4 and the ground voltage VSS based on an initialization signal INIT. The PMOS transistor MP3 may pull up the sensing node NS to the power supply voltage VDD based on a pull up signal SNP.

The read operation may be implemented by a voltage sensing scheme or a current sensing scheme. The voltage of the bitline BL may be developed to the sensing node NS during the develop period while the precharge transistor MT1 is turned off according to the voltage sensing scheme. The voltage of the bitline BL may be developed to the sensing node NS during the develop period while the precharge transistor MT1 is turned on according to the current sensing scheme. An example current sensing scheme is described with reference to FIG. 9, but example embodiments are not limited thereto.

Figure 9:
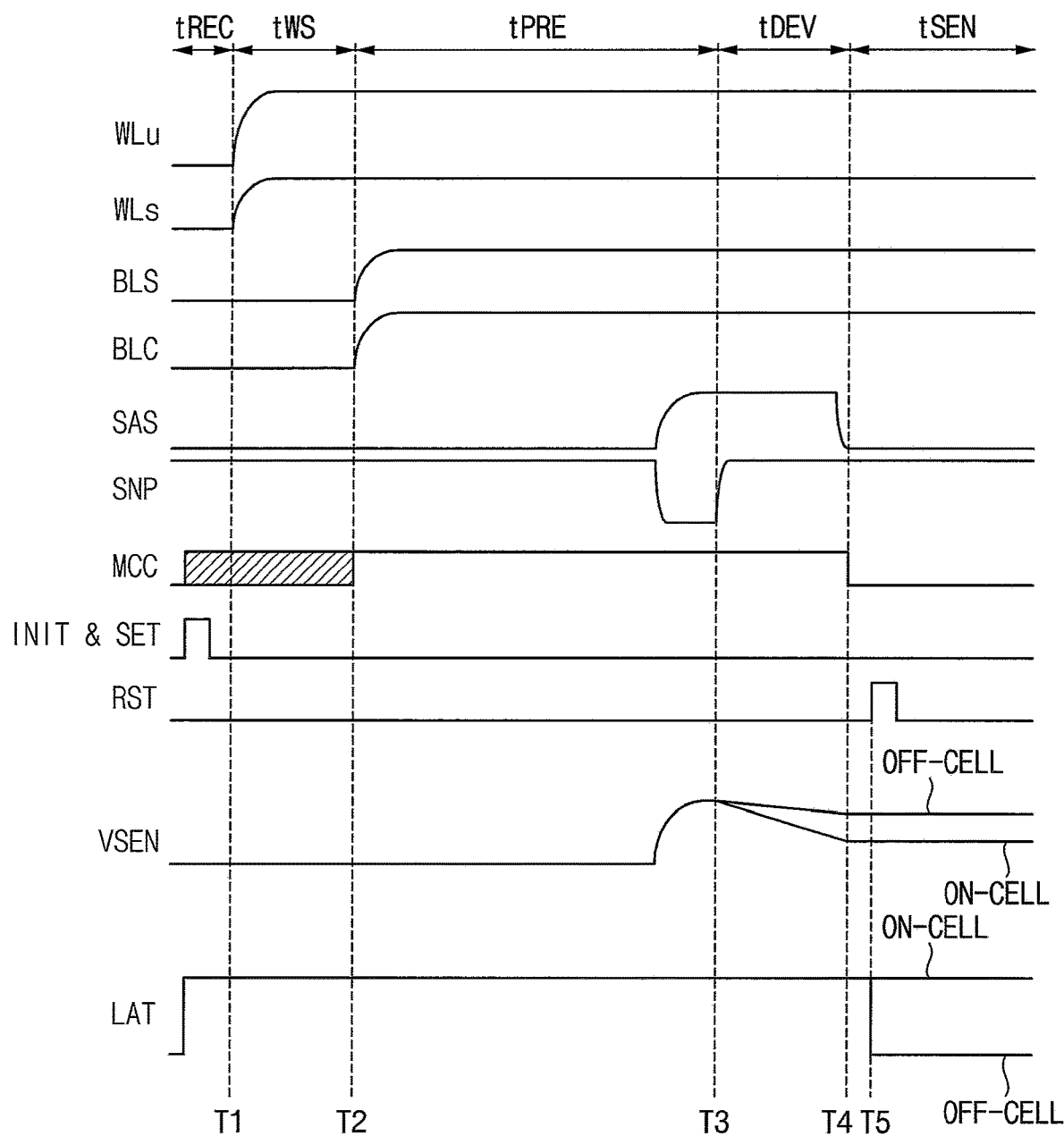
FIG. 9 is a timing diagram illustrating operation of a nonvolatile memory device including the sense amplifier of FIG. 8 according to example embodiments.

FIG. 9 is a timing diagram illustrating operation of a nonvolatile memory device including the sense amplifier of FIG. 8 according to example embodiments. Hereinafter descriptions repeated with FIGS. 7A and 7B may be omitted.

Referring to FIGS. 2, 8 and 9, during a recovery period tREC, the initialization signal INIT and the set signal SET may be activated, the second node N2 and the fourth node N4 may be pulled down to the ground voltage VSS and the latch signal LAT may be initialized to a logic high level.

At time point T1, a read voltage may be applied to a selected wordline WLs to which a selected memory cell is connected, and a pass voltage may be applied to unselected wordlines WLu to which unselected memory cells are connected.

At time point T2, the bitline selection signal BLS and the precharge signal BLC may be activated. Accordingly the bitline selection transistor MT2 and the precharge transistor MT1 may be turned on to generate the bitline current IBL during the precharge period tPRE and the develop period tDEV.

In addition, the current control signal MCC may be activated at the time point T2 to generate the control current ICON during the precharge period tPRE and the develop period tDEV. As described above, the bitline current IBL may be increased by generating the control current ICON. In some example embodiments, the activation time point of the current control signal MCC may be precede the time point T1 or the time point T2 as represented by the hatched portion in FIG. 9.

The develop signal SAS may be deactivated and the develop transistor MT3 may be turned off during the wordline setup period tWS and the precharge period tPRE. In some example embodiments, as illustrated in FIG. 9, the develop signal SAS may be activated before the end of the precharge period tPRE, according to the configuration of the sense amplifier SA.

The pull up signal SNP may be activated to the logic low level in synchronization with the develop signal SAS being activated to the logic high level, and the pull up signal may be deactivated to the logic high level again at the time point T3. Accordingly the sensing voltage VSEN at the sensing node NS may be pulled up temporarily to the power supply voltage VDD and may start being developed at the time point T4 depending on the voltage of the bitline BL. As illustrated in FIG. 9, the sensing voltage VSEN may slowly decrease in case of the off cell due to the relatively small cell current ICL and the sensing voltage VSEN may rapidly decrease in case of the on cell due to the relatively large cell current ICL.

During the sensing period tSEN, for example at the time point T5, the reset signal RST may be activated to electrically connect the first node N1 and the third node N3. In case of the selected memory cell being the off cell, the NMOS transistor MN4 may be turned on because the sensing voltage VSEN is higher than the threshold voltage of the NMOS transistor MN4 and the latch signal LAT at the first node N1 may transition from the logic high level to the logic low level. In contrast, in case of the selected memory cell being the on cell, the NMOS transistor MN4 may be turned off because the sensing voltage VSEN is lower than the threshold voltage of the NMOS transistor MN4 and the latch signal LAT at the first node N1 may maintain the initialized logic high level.

FIGS. 10A, 10B, 11A and 11B are diagrams illustrating reduction of a precharge time in a nonvolatile memory device according to example embodiments.

Figure 10A:
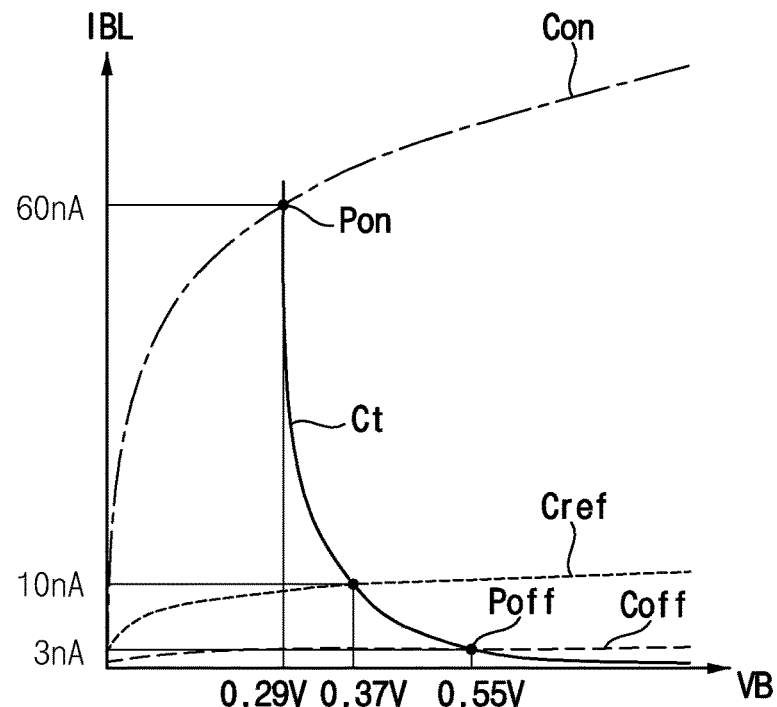
FIGS. 10A, 10B, 11A and 11B are diagrams illustrating reduction of a precharge time in a nonvolatile memory device according to example embodiments.
Figure 10B:
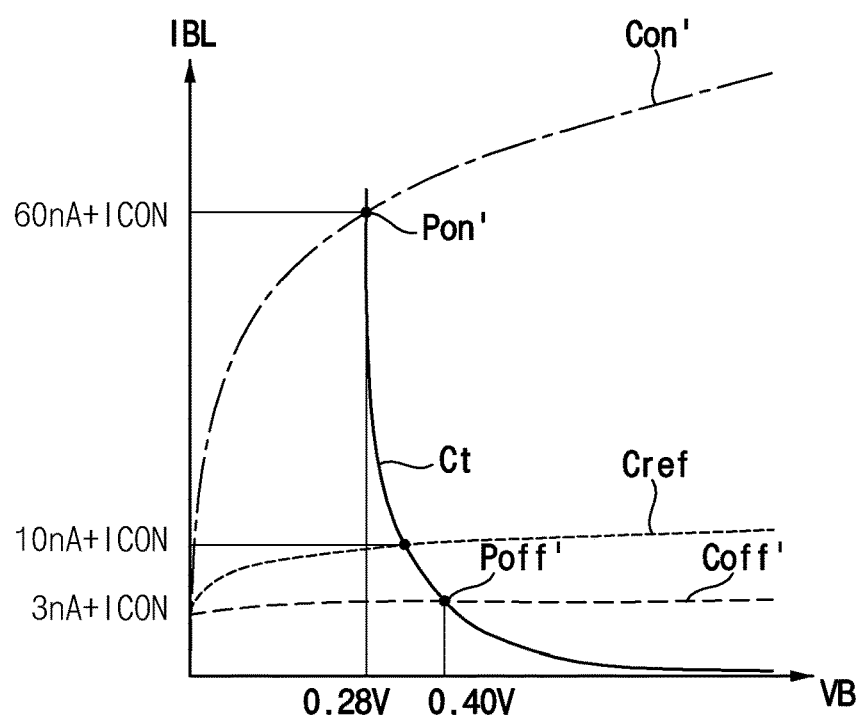
Figure 11A:
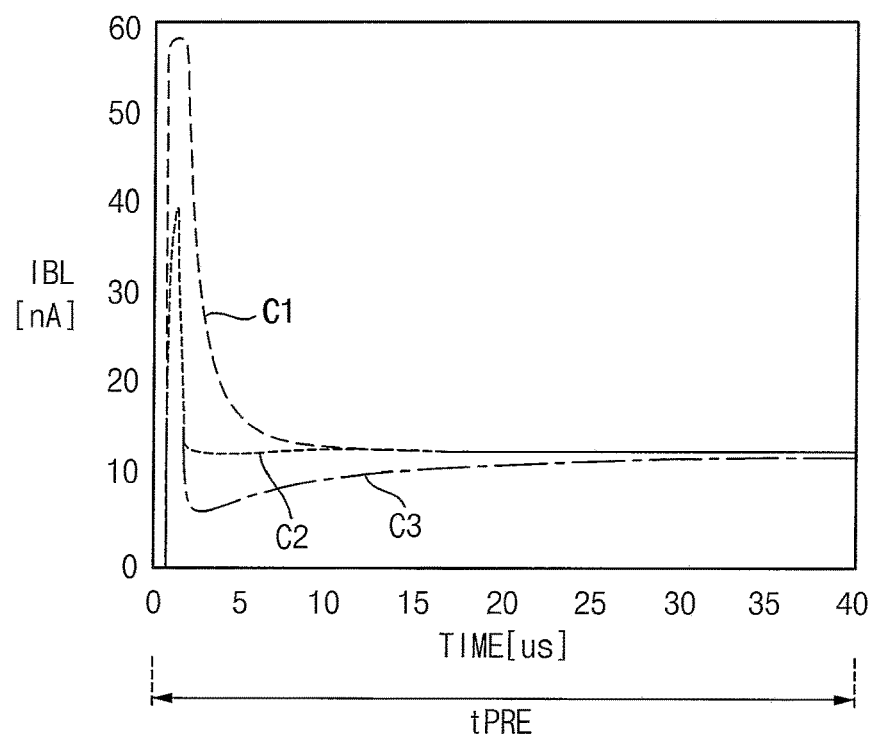
Figure 11B:
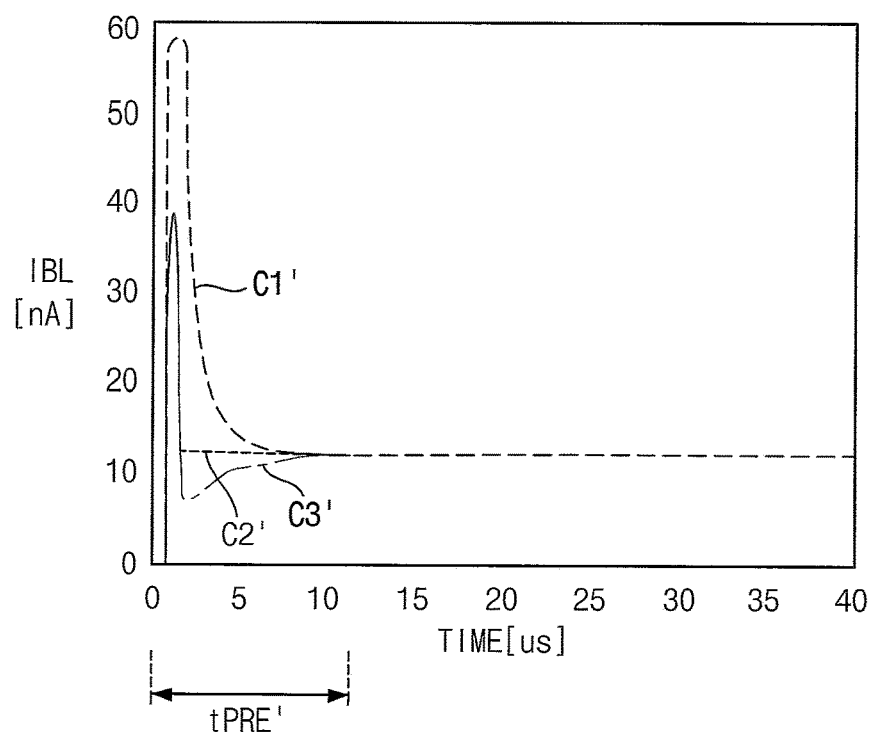

FIGS. 10A and 11A illustrate an example in which the above-mentioned control current ICON is not generated, and FIGS. 10B and 11B illustrate an example in which the control current ICON is generated according to example embodiments.

In FIGS. 10A and 10B, Ct indicates a current-voltage characteristics of the bitline selection transistor MT2 in FIG. 2, Con and Con' indicate a relation between the bitline current IBL and the bitline voltage VB in case of the selected memory cell being the on cell, Coff and Coff' indicate a relation between the bitline current IBL and the bitline voltage VB in case of the selected memory cell being the off cell, Cref indicates a case of a reference cell such that the programmed state of the selected memory cell is to generate the sensing voltage VSEN that is the same as the threshold voltage of the NMOS transistor MN4 in FIG. 8.

The bitline current IBL and the bitline voltage VB of the on cell and the off cell may be determined by the cross points Pon, Pon', Poff and Poff' as illustrated in FIGS. and 10B. For example, the bitline current IBL of the on cell, the reference cell and the off cell may be 3 nA (nano Ampere), 10 nA and 60 nA, and the bitline voltage VB may 0.29V, 0.37V and 0.55V, respectively.

As illustrated in FIG. 10B, when the bitline current IBL is increased by the control current ICON, the bitline voltage VB corresponding to the on cell may slightly decrease from 0.29V to 0.28V, but the bitline voltage VB corresponding to the off cell may significantly decrease from 0.55V to 0.40V.

FIGS. 11A and 11B illustrate changes of the bitline current IBL over time. C1 and C1' indicates the cases of the selected memory cell being the on cell, C2 and C2' indicates the cases of the selected memory cell being the reference cell, and C3 and C3' indicates the cases of the selected memory cell being the off cell.

The bitline voltage VB may decrease as illustrated in FIGS. 10A and 10B, and the time for stabilizing the bitline current IBL may decrease as illustrated in FIGS. 11A and 11B. Accordingly the time interval of the precharge period tPRE' in case of generating the control current ICON may be reduced in comparison with the time interval of the precharge period tPRE in case of not generating the control current ICON.

Figure 12:
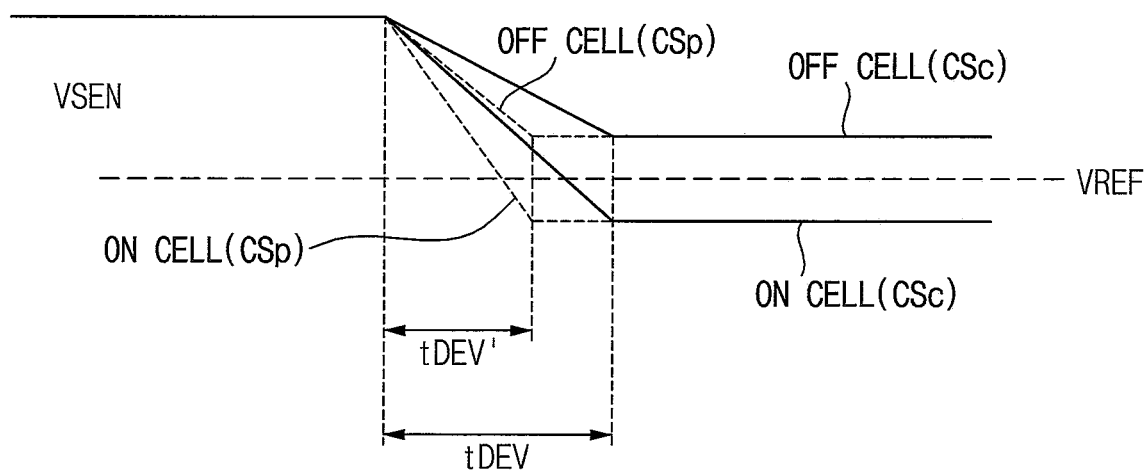
FIG. 12 is a diagram illustrating reduction of a develop time in a nonvolatile memory device according to example embodiments.

FIG. 12 is a diagram illustrating reduction of a develop time in a nonvolatile memory device according to example embodiments.

In FIG. 12, CSc indicates the sensing voltage VSEN in case that the control current ICON is not generated and CSp indicates the sensing voltage VSEN in case that the control current ICON is generated. For convenience of illustration and description, FIG. 12 illustrates that the sensing voltage VSEN develops from the same voltage level. VREF in FIG. 12 indicates the voltage level of the sensing voltage VSEN corresponding to the case that the latch signal LAT transitions at the time point T5 as illustrated in FIG. 9.

The bitline voltage VB may be decreased by generating the control current ICON as described with reference to FIGS. 10A and 10B, and thus the time interval of the develop period tDEV' in case of generating the control current ICON may be reduced in comparison with the time interval of the develop period tDEV in case of not generating the control current ICON.

Figure 13:
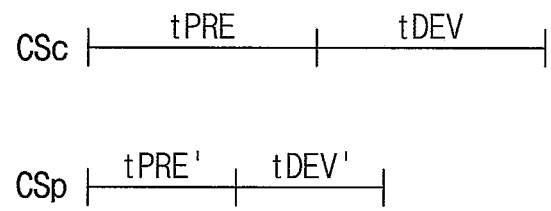
FIG. 13 is a diagram illustrating reduction of a read time in a nonvolatile memory device according to example embodiments.

FIG. 13 is a diagram illustrating reduction of a read time in a nonvolatile memory device according to example embodiments.

FIG. 13 illustrates the precharge period tPRE and the develop period tDEV corresponding to an example in which the control current ICON is not generated, and the precharge period tPRE' and the develop period tDEV' corresponding to an example in which the control current ICON is generated. The recovery period tREC, the wordline setup period tWS and the sensing period tSEN are irrelevant of the control current ICON and thus are omitted in FIG. 13.

As such, the reduced precharge period tPRE' and the reduced develop period tDEV' may be implemented by generating the control current ICON. As a result, the entire time of the read operation may be reduced and the performance of the nonvolatile memory device may be enhanced.

The magnitude of the cell current ICL may be varied depending on the operation conditions and the operation characteristics of the nonvolatile memory device. For example, the cell current ICL may be changed according to the operation temperature, the operation voltage, etc. of the nonvolatile memory device and the cell current ICL may be changed according to the position of the selected cell string, the position of the selected wordline, etc.

In some example embodiments, considering the variation of the cell current ICL, the magnitude of the control current ICON may be adjusted such that the deviation of the bitline current IBL may be decreased. To decrease the deviation of the bitline current IBL, the control current ICON may be decreased when the cell current ICL is relatively large, and the control current ICON may be increased when the cell current ICL is relatively small. As described above, the magnitude of the control current ICON may be adjusted by controlling the voltage level of the current control signal MCC.

As the deviation of the bitline current IBL is decreased, the page buffer may be optimized easily and the sensing performance of the page buffer may be improved. As such, the read time may be reduced and the performance of the nonvolatile memory device may be enhanced by generating the control current ICON according to example embodiments.

Figure 14A:
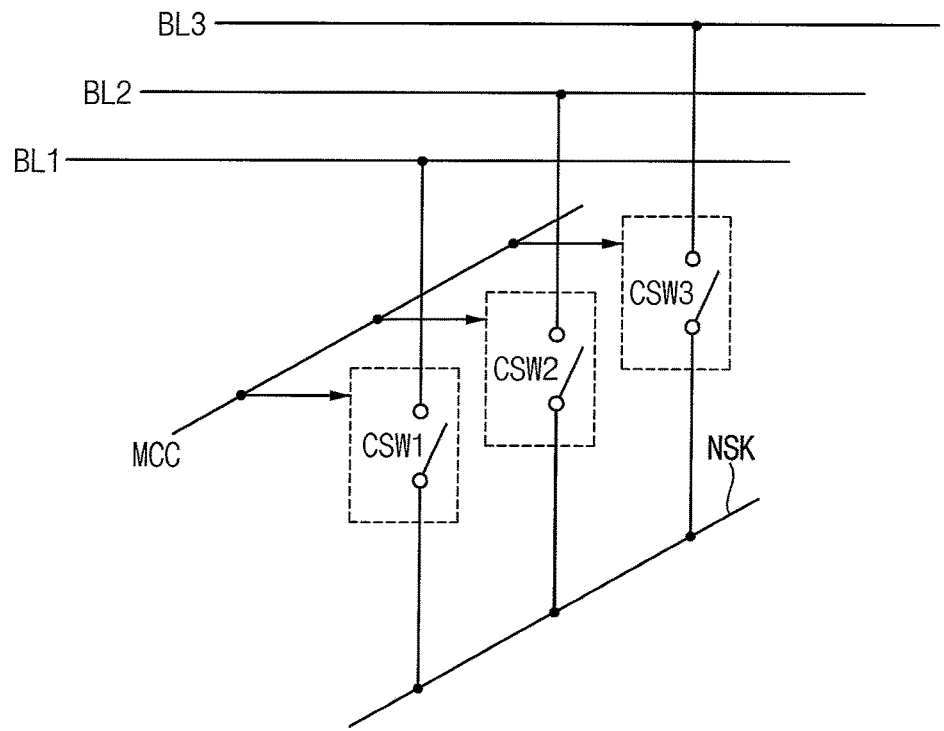
FIGS. 14A and 14B are diagrams illustrating a nonvolatile memory device according to example embodiments.
Figure 14B:
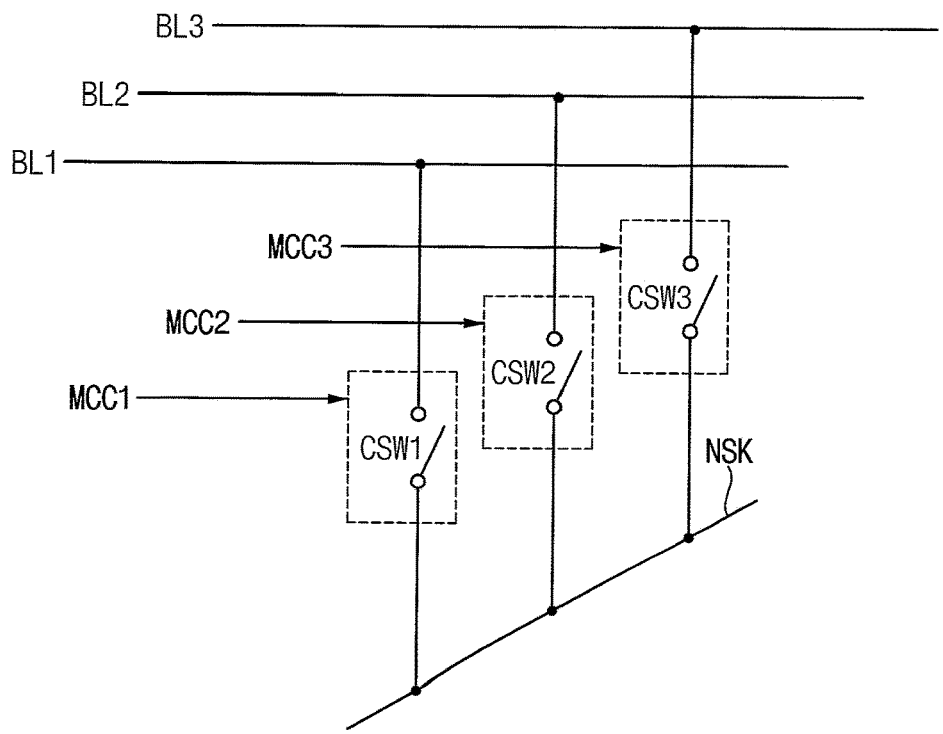

FIGS. 14A and 14B are diagrams illustrating a nonvolatile memory device according to example embodiments.

A plurality of precharge transistor MT1 as described with reference to FIG. 2 may electrically connect a plurality of bitlines BL1, BL2 and BL3 to the power supply voltage VDD during the precharge period tPRE for the read operation to generate a plurality of bitline currents IBL respectively flowing from the power supply voltage VDD to the plurality of bitlines BL1, BL2 and BL3. In addition, a plurality of cell strings respectively connected between the plurality of bitlines BL1, BL2 and BL3 and the source line CSL may generate a plurality of cell currents ICL.

As illustrated in FIGS. 14A and 14B, a plurality of current control switch circuits CSW1, CSW2 and CSW3 may be connected between the plurality of bitlines BL1, BL2 and BL3 and the sink node NSK, respectively. As described above, the plurality of current control switch circuits CSW1, CSW2 and CSW3 may generate the plurality of control currents respectively flowing from the plurality of bitlines BL1, BL2 and BL3 to the sink node NSK to increase the plurality of bitline currents.

During the precharge period, the plurality of current control switch circuits CSW1, CSW2 and CSW3 may generate the plurality of control currents with respect to all of the plurality of bitlines BL1, BL2 and BL3, regardless of whether the selected memory cells are the on cell or the off cell.

In some example embodiments, as illustrated in FIG. 14A, the plurality of current control switch circuits CSW1, CSW2 and CSW3 may receive a single current control signal MCC and generate the plurality of control currents based on the single current control signal MCC.

In some example embodiments, as illustrated in FIG. 14B, the plurality of current control switch circuits CSW1, CSW2 and CSW3 receive a plurality of current control signals MCC1, MCC2 and MCC3, respectively, and generate the plurality of control currents respectively based on the plurality of current control signals MCC1, MCC2 and MCC3. The plurality of current control signals MCC1, MCC2 and MCC3 may have the different voltage levels that are determined independently of each other according to the deviation of the operation characteristics of each bitline. Using the plurality of current control signals MCC1, MCC2 and MCC3, the control currents may be controlled finely with respect to each of the bitlines BL1, BL2 and BL3.

Figure 15:
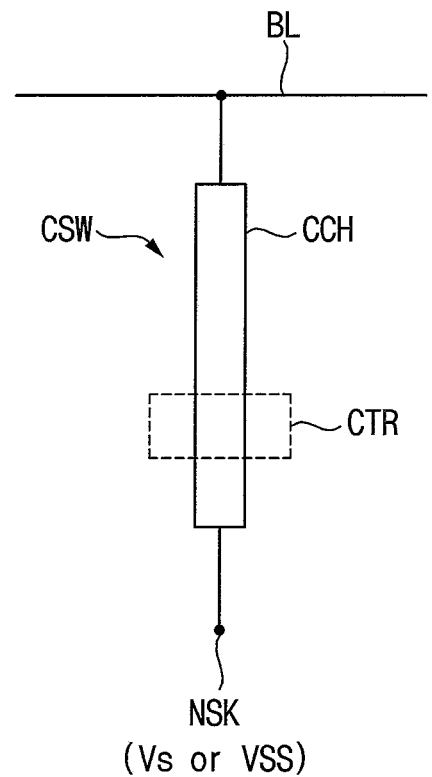
FIG. 15 is a diagram illustrating a current control switch circuit according to example embodiments.

FIG. 15 is a diagram illustrating a current control switch circuit according to example embodiments.

Referring to FIG. 15, a nonvolatile memory device may include a current control channel structure CCH connected between the bitline BL and the source line CSL. As will be described below with reference to FIGS. 16 through 27, the current control channel structure CCH may be disposed in a contact area. In this case, a current control transistor CTR may be included in the current control channel structure CCH.

Figure 16:
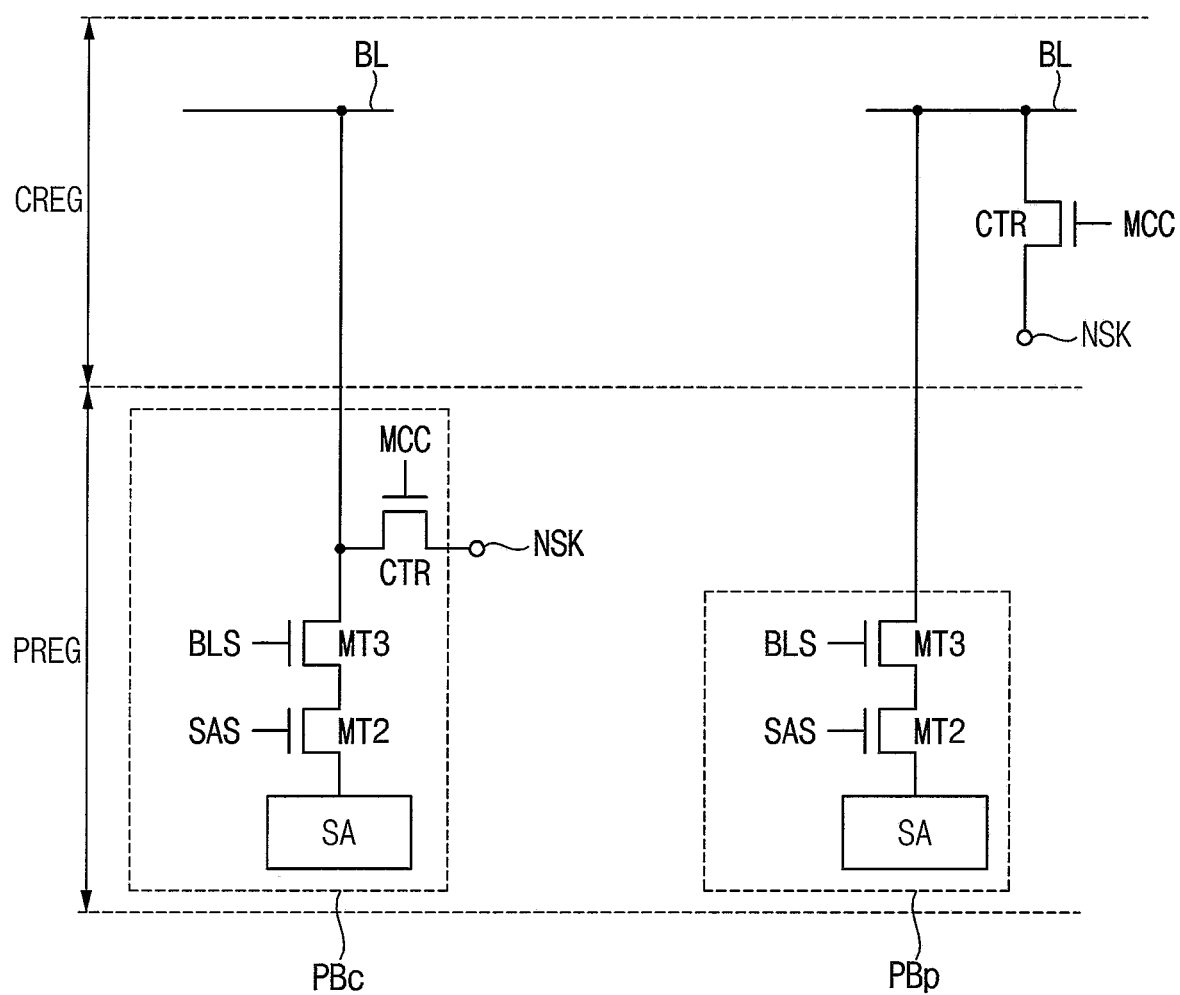
FIG. 16 is a diagram illustrating size reduction of a nonvolatile memory device including the current control switch circuit of FIG. 15.

FIG. 16 is a diagram illustrating size reduction of a nonvolatile memory device including the current control switch circuit of FIG. 15.

A large number of page buffers may be disposed in a peripheral region PREG, for example when the number of the page buffers is equal (or proportional) to the number of bitlines BL. FIG. 16 illustrates a page buffer PBc when the current control transistor CTR is disposed in the peripheral region PREG and a page buffer PBp when the current control transistor CTR is disposed in a cell region CREG.

The page buffer PBc includes a sense amplifier SA, transistors MT2 and TM2 configured to control the electric connection between the bitline BL and the sense amplifier SA based on the signals SAS and BLS, and the current control transistor CTR configured to control the electric connection between the bitline BL and the sink node NSK based on the current control signal MCC.

In contrast, the page buffer PBc does not include the current control transistor CTR and the current control transistor CTR may be disposed in the cell region CREG. As will be described below, the current control transistor CTR may be implemented using the current control channel structure CCH disposed in the cell region CREG.

As a result, the page buffer PBp may have a reduced size in comparison with the page buffer PBc by removing the current control transistor CTR from the page buffer PBp. In general, the nonvolatile memory device includes a large number of page buffers, and the size of the nonvolatile memory device may significantly decrease by decreasing the size of each page buffer.

As such, the sizes of the page buffer circuit and the nonvolatile memory device may be reduced by removing the current control transistor CTR to generate the control current ICON from the page buffer circuit and implementing the current control transistor CTR using the current control channel structure CCH.

Figure 17:
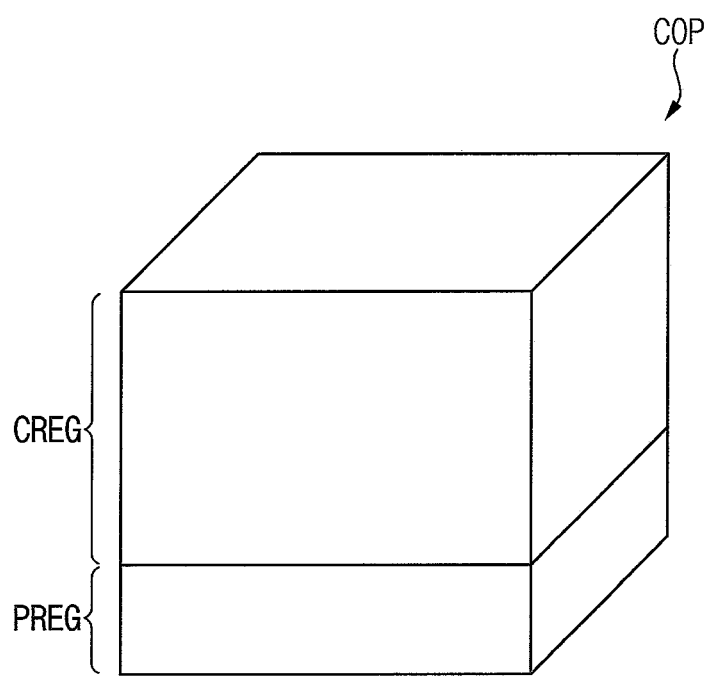
FIG. 17 is a perspective view of a nonvolatile memory device having a cell over periphery (COP) structure according to example embodiments.

FIG. 17 is a perspective view of a nonvolatile memory device having a cell over periphery (COP) structure according to example embodiments.

Referring to FIG. 17, a nonvolatile memory device may include a peripheral region PREG in which a peripheral circuit is formed and a cell region CREG in which a memory cell array is formed.

The peripheral region PREG may include a semiconductor substrate, a peripheral circuit formed on a top surface of the semiconductor substrate and a lower insulation layer covering the peripheral circuit. The cell region CREG may include a base layer formed on the lower insulation layer, a memory cell array formed on the base layer 13, and an upper insulation layer covering the memory cell array.

As such, the memory device according to example embodiments may reduce a size of the memory device by adopting the COP structure in which the peripheral circuit is formed on the semiconductor substrate and the memory cell array is stacked on the peripheral circuit. In addition, the memory device may further reduce the size of the memory device by removing the current control transistor from the page buffer circuit in the peripheral region PREG and implementing the current control transistor CTR in the cell region CREG using the current control channel structure CCH.

Figure 18:
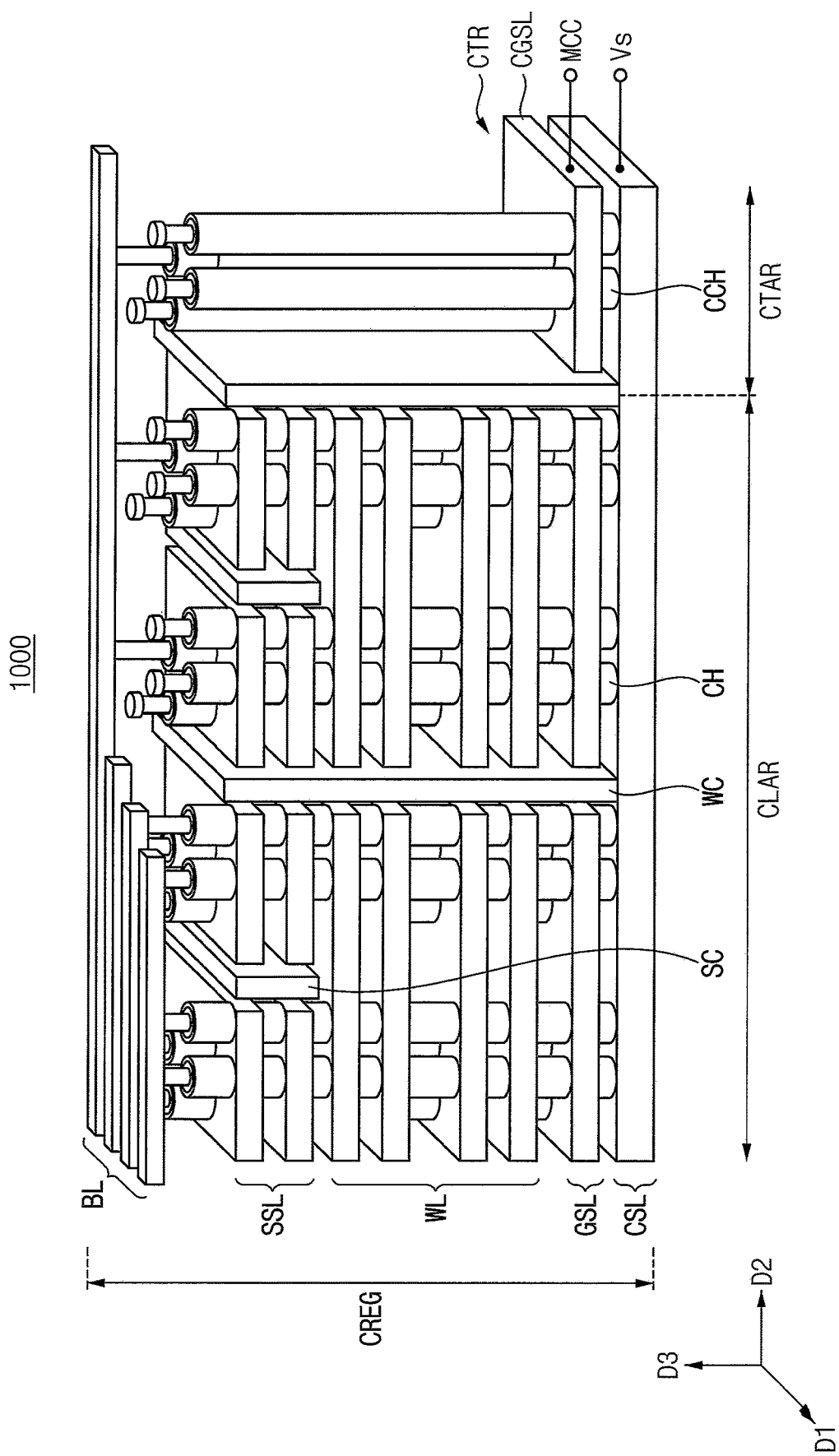
FIG. 18 is a perspective view illustrating a nonvolatile memory device according to example embodiments.

FIG. 18 is a perspective view illustrating a nonvolatile memory device according to example embodiments.

Referring to FIG. 18, a nonvolatile memory device 1000 may include a plurality of bitlines BL, at least one source line CSL, a plurality of cell channel structures CH, a gate electrode structure, a plurality of current control channel structures CCH and a current control line CGSL.

The plurality of bitlines BL may be disposed in a first end portion in a vertical direction D3 of a cell region CREG. The plurality of bitlines BL may be arranged in a first horizontal direction D1 and extend in a second horizontal direction D2.

The source line CSL may be disposed in a second end portion in the vertical direction D3 of the cell region CREG and extend in the second horizontal direction D2. In some example embodiments, the source line CSL may include a plurality of lines arranged in the first horizontal direction D1. In some example embodiments, as illustrated in FIG. 18, the source line CSL may be implemented as a common source line having a planar shape.

In some example embodiments, as illustrated in FIG. 18, the source line CSL may extend in the second horizontal direction D2 in a cell string area CLAR and a contact area CTAR without cutting. The source line CSL may be connected commonly to the plurality of cell channel structures CH and the plurality of current control channel structures CCH. In this case, the source voltage Vs applied to the source line CSL may be simultaneously applied to the bottom portions of the cell channel structures CH and the current control channel structures CCH.

In some example embodiments, as will be described below with reference to FIG. 24, the source line CSL may be cut at a boundary between the cell string area CLAR and the contact area CTAR such that the source line CSL may be divided into a first source line segment and a second source line segment.

The plurality of cell channel structures CH may be disposed in the cell string area CLAR of the cell region CREG and respectively connected between the plurality of bitlines BL and the source line CSL. As will be described below, each cell channel structure CH may include at least one string selection transistor, a plurality of memory cells and at least one ground selection transistor.

The gate electrode structure may include a plurality of gate lines that are stacked in the vertical direction D3 in the cell string area CLAR. The gate electrode structure may include at least one string selection line SSL, a plurality of wordlines WL and at least one ground selection line GSL. The string selection line SSL corresponds to gate electrodes of the string selection transistors, the wordlines WL correspond to gate electrodes of the memory cells and the ground selection line GSL corresponds to gate electrodes of the ground selection transistors. The wordlines WL may be cut by wordline cut areas WC, and the string selection line SSL may be cut by the wordline cut areas WC and string selection line cut arrears SC.

FIG. 18 illustrates an example of the two string selection lines SSL and the one ground selection line GSL. However, example embodiments are not limited thereto, and the number of the string selection lines and the number of the ground selection lines may vary.

The plurality of current control channel structures CCH may be disposed in the contact area CTAR of the cell region CREG. The plurality of current control channel structures CCH may be respectively connected between the plurality of bitlines BL and the source line CSL. The plurality of current control channel structures CCH may include a plurality of current control transistors CTR.

The current control line CGSL may be disposed in the contact area CTAR to form a gate electrode of the plurality of current control transistors CTR. The current control transistor CTR may be switched by a current control signal MCC having a turn-on voltage or a turn-off voltage according to operation modes. During a read operation, the current control transistor CTR may be turned on by applying the turn-on voltage to the current control line CGSL to generate the above-described control current ICON. In contrast, during a program operation and a read operation, the current control transistor CTR may be turned off by applying the turn-off voltage to the current control line CGSL to electrically disconnect the bitline BL from the source line CSL.

As illustrated in FIG. 18, the ground selection transistor of the cell channel structure CH and the current control transistor CTR of the current control channel structure CCH may be disposed at the same height in the vertical direction D3. In this case, the current control line CGSL may be a portion of the ground selection line GSL. For example, the portion corresponding to the current control line CGSL may be provided by cutting the ground selection line GSL at the boundary between the cell string area CLAR and the contact area CTAR. For example, the ground selection line GSL may be cut by the wordline cut area WC at the boundary between the cell string area CLAR and the contact area CTAR, and the portion of the ground selection line GSL in the contact area CTAR may be implemented as the current control line CGSL.

The nonvolatile memory device 1000 may include a plurality of page buffers connected to the plurality of bitlines BL. When the current control transistor is included in the page buffer, the size of the page buffer may be increased as described with reference to FIG. 16. According to example embodiments, the current control transistor CTR may be implemented in the contact area CTAR of the cell region CREG to decrease the size of the page buffer. In general, the nonvolatile memory device includes a large number of page buffers, and the size of the nonvolatile memory device may significantly decrease by decreasing the size of each page buffer.

As such, the nonvolatile memory device according to example embodiments may reduce the size of the page buffer circuit and the nonvolatile memory device including the page buffer circuit by removing the current control transistor CTR to generate the control current ICON from the page buffer circuit and implementing the current control transistor CTR using the current control channel structure CCH.

Figure 19:
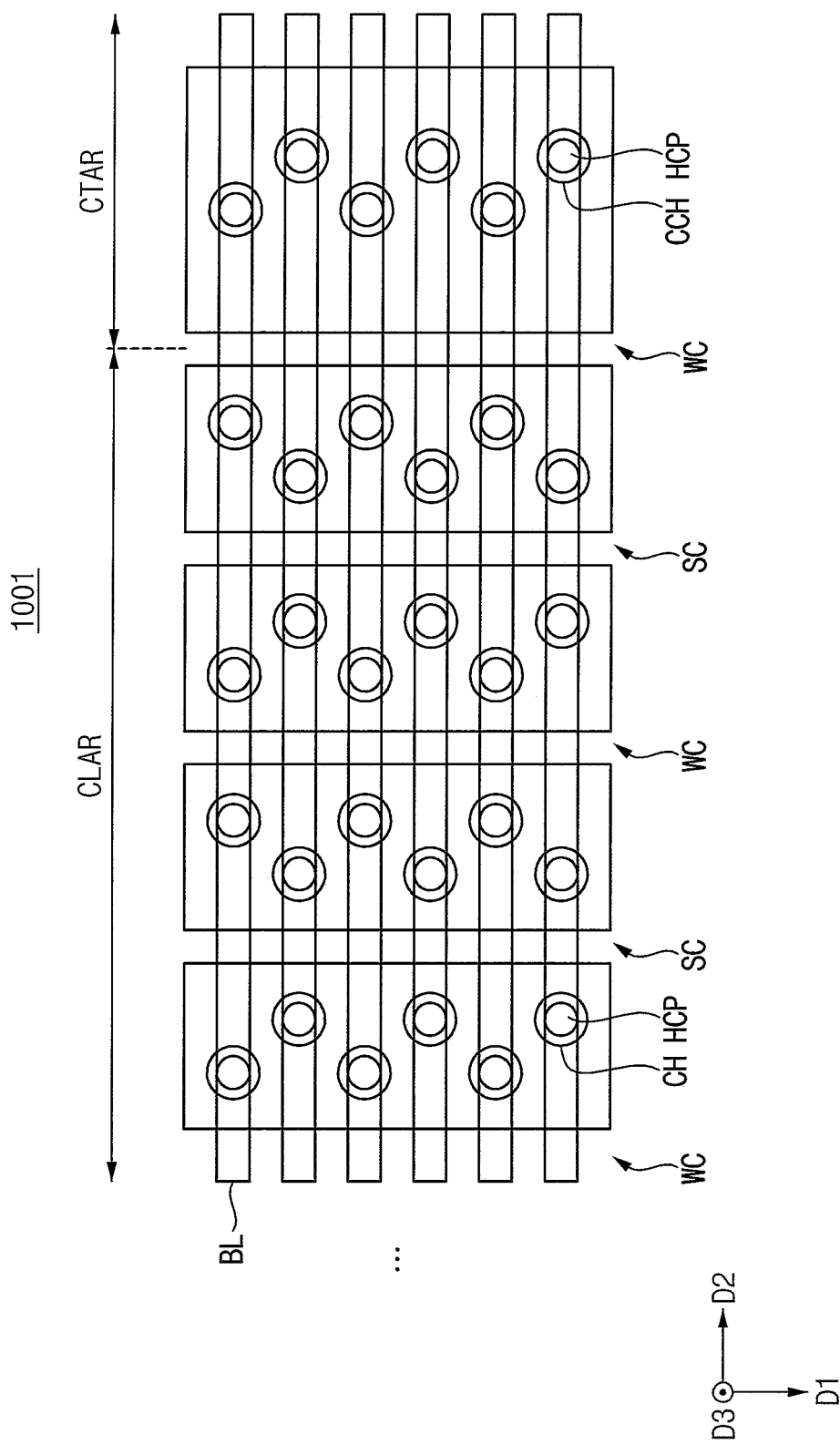
FIG. 19 is a plan view illustrating a nonvolatile memory device according to example embodiments.
Figure 20:
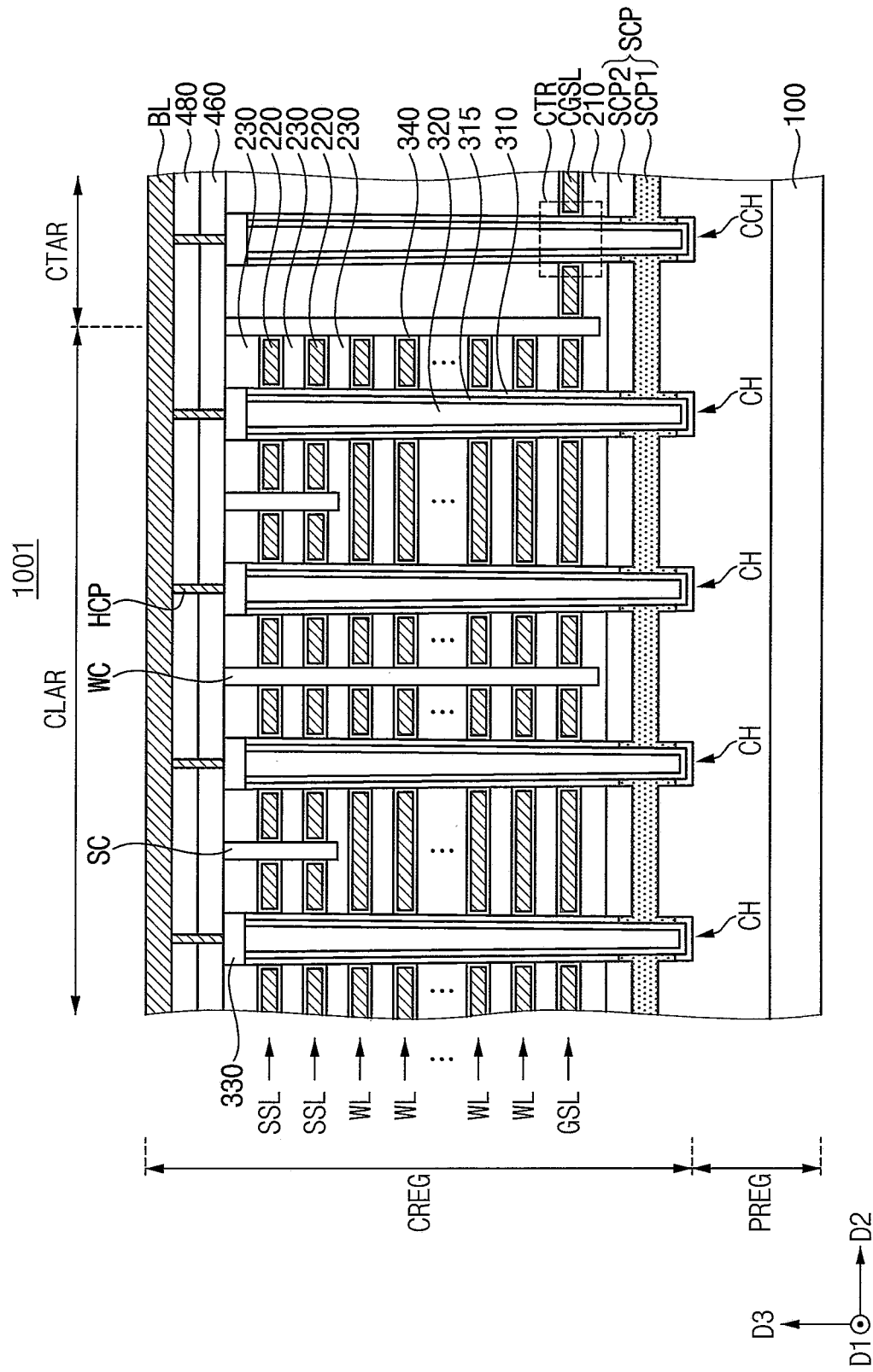
FIG. 20 is a cross-sectional diagram illustrating an example vertical structure of the nonvolatile memory device of FIG. 19.

FIG. 19 is a plan view illustrating a nonvolatile memory device according to example embodiments, and FIG. 20 is a cross-sectional diagram illustrating an example vertical structure of the nonvolatile memory device of FIG. 19. FIG.

21 is an enlarged sectional view of an end portion of a current control channel structure included in the nonvolatile memory device of FIG. 20.

Figure 21:
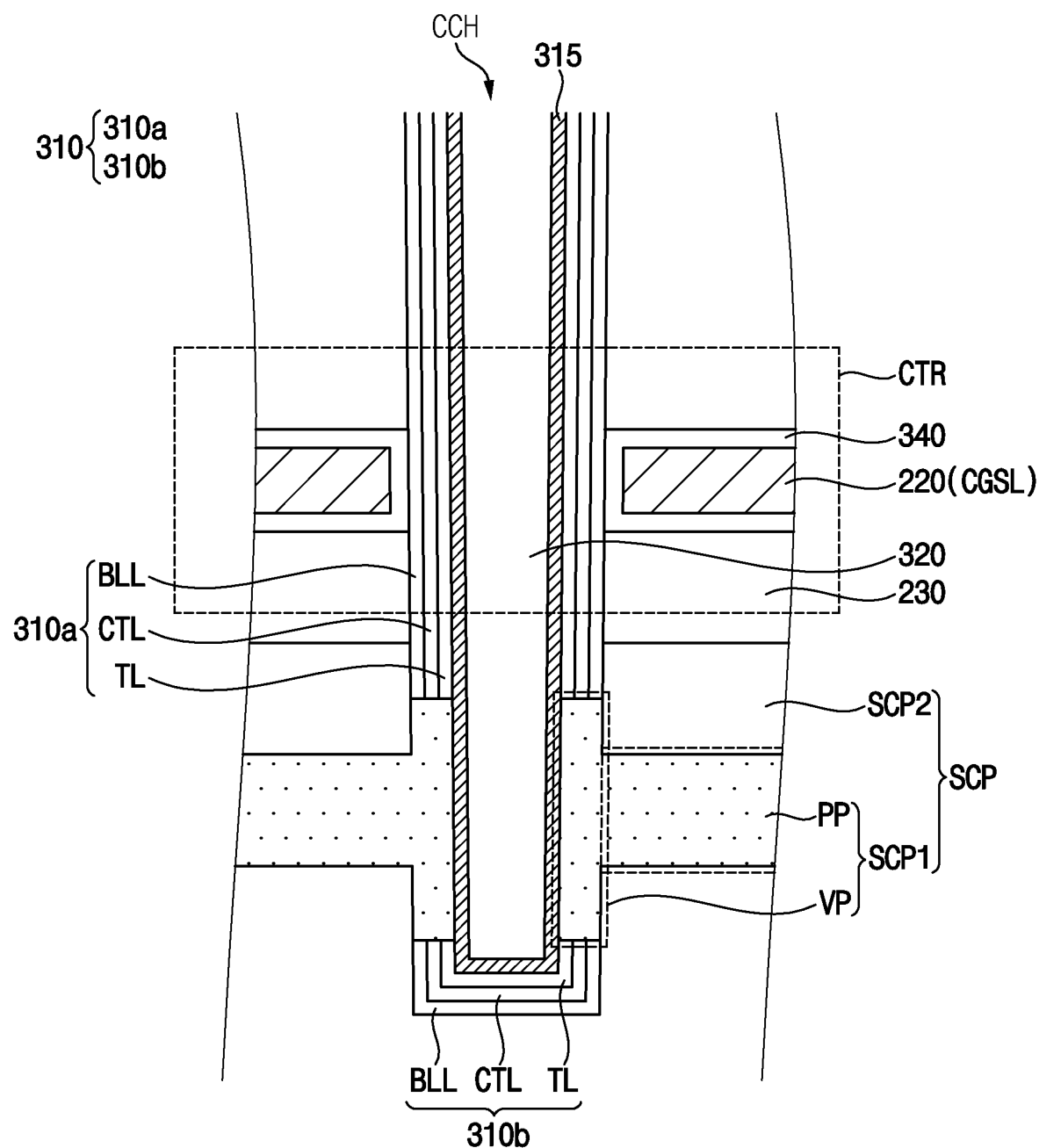
FIG. 21 is an enlarged sectional view of an end portion of a current control channel structure included in the nonvolatile memory device of FIG. 20.

Referring to FIGS. 19, 20 and 21, a gate electrode structure including gate lines or gate electrodes SSL, WL and GSL may be disposed above a semiconductor substrate 100. The semiconductor substrate 100 may include a semiconductor material, e.g., silicon, germanium, silicon-germanium, or III-V semiconductor compounds, e.g., GaP, GaAs, GaSb, etc. The gate electrode structure SSL, WL and GSL may be cut by the string selection line cut areas SC and/or the wordline cut areas WC as described above.

The gate electrode structure SSL, WL and GSL may include a buffer oxide layer 210, as well as gate electrodes 220 and insulating patterns 230 which are alternately and repeatedly stacked on the buffer oxide layer 210. The buffer oxide layer 210 may cover a top surface of the semiconductor substrate 100. The buffer oxide layer 210 may include, for example, a thermally-grown oxide layer or a silicon oxide layer. The gate electrodes 220 may include at least one ground selection gate electrode GSL, cell gate electrodes WL, and at least one string selection gate electrode SSL. The ground selection gate electrode GSL may be the lowermost electrode of the gate electrodes 220, and the string selection gate electrode SSL may be the uppermost electrode of the gate electrodes 220. The cell gate electrodes WL may be disposed between the ground selection gate electrode GSL and the string selection gate electrode SSL. The gate electrodes 220 may be formed of or may include at least one of, for example, doped silicon, metals (e.g., tungsten), metal nitrides, metal silicides, or any combination thereof.

The insulating patterns 230 may be disposed between the gate electrodes 220, which are placed adjacent to each other in the vertical direction D3 perpendicular to the top surface of the semiconductor substrate 100. The majority of the insulating patterns 230 may have the same thickness, and at least one of the insulating patterns 230 may be thicker than other insulating patterns. For example, an uppermost insulating pattern (hereinafter, a first insulating pattern) on the string selection gate electrode SSL may be thicker than underlying insulating patterns. The first insulating pattern may be thicker by at least two times than the underlying insulating patterns. The insulating patterns 230 may be formed of or may include, for example, silicon oxide.

As described above, the nonvolatile memory device 1001 may be divided in the vertical direction D3 into the cell region CREG and the peripheral region PREG, and may be divided in the second horizontal direction D2 into the cell string area CLAR and the contact area CTAR.

The cell channel structures CH may penetrate the gate electrode structure SSL, WL and GSL. Each cell channel structure CH may include a vertical channel portion 315 and a charge storing structure 310 surrounding the vertical channel portion 315. In addition, each cell channel structure CH may include an internal space, which is formed in the vertical channel portion 315, and a gap-fill layer 320, which is surrounded by the internal space. Each cell channel structure CH may include a pad 330 provided in an upper portion thereof. The plurality of cell channel structures CH may be arranged in a zigzag shape or in a line shape, when viewed top down. The vertical channel portions 315 may be electrically connected to the semiconductor substrate 100. The vertical channel portions 315 may include a single layer or a plurality of layers. The vertical channel portions 315 may include at least one of, for example, a single crystalline silicon layer, an organic semiconductor layer, or carbon nanostructures.

The charge storing structures 310 may extend along outer sidewalls of the vertical channel portions 315 and in the vertical direction D3. For example, the charge storing structures 310 may have a shape surrounding the outer sidewalls of the vertical channel portions 315. The charge storing structures 310 may include at least one of, for example, a silicon oxide layer, a silicon nitride layer, a silicon oxynitride layer, and high-k dielectric layers and may have a single- or multi-layered structure.

As shown in FIG. 21, each of the charge storing structures 310 may include a tunnel insulating layer TL, a blocking insulating layer BLL, and a charge storing layer CTL. The tunnel insulating layer TL may be disposed adjacent to each of the vertical channel portions 315 to enclose or cover the outer sidewall of the vertical channel portion 315. The blocking insulating layer BLL may be disposed adjacent to the gate electrodes 220. The charge storing layer CTL may be disposed between the tunnel insulating layer TL and the blocking insulating layer BLL. The tunnel insulating layer TL may include, for example, a silicon oxide layer or a high-k dielectric layer (e.g., aluminum oxide (Al2O3) or hafnium oxide (HfO2)). The blocking insulating layer BLL may include, for example, a silicon oxide layer or a high-k dielectric layer (e.g., aluminum oxide (Al2O3) or hafnium oxide (HfO2)). The charge storing layer CTL may include, for example, a silicon nitride layer. The gap-fill layers 320 may include, for example, a silicon oxide layer, a silicon nitride layer, or a silicon oxynitride layer.

The pad 330 may be disposed in the upper portion of each cell channel structure CH and each current control channel structure CCH. The pad 330 may extend laterally to cover the top surface of the vertical channel portion 315 and a top surface of the charge storing structure 310. The pad 330 may cover at least one of a top surface of the tunnel insulating layer TL, a top surface of the charge storing layer CTL, and a top surface of the blocking insulating layer BLL. For example, as shown in FIG. 20, the pad 330 may cover all of the top surfaces of the tunnel insulating layer TL, the charge storing layer CTL, and the blocking insulating layer BLL. The pad 330 may include a semiconductor material that is doped with impurities of the first conductivity type. As an example, the pad 330 may be a highly doped n-type region.

The vertical channel portion 315 and the pad 330 may be formed of a semiconductor material (e.g., silicon). As an example, the vertical channel portion 315 and the pad 330 may include poly silicon. The vertical channel portion 315 and the pad 330 may have different crystallographic structures from each other.

During the erase operation, the source voltage Vs of a very high voltage level may be applied to the bitlines BL, and, through the GIDL phenomenon, electron-hole pairs may be produced in the vertical channel portion 315. The electrons may be moved toward the pads 330 and the holes may be supplied to the vertical channel portions 315. Thus, it may be possible to effectively provide the holes into the charge storing layers CTL from the vertical channel portions 315, during the erase operation, and consequently to improve an erase operation property of the three-dimensional nonvolatile memory device.

A first interlayered insulating layer 460 may be disposed on the gate electrode structure SSL, WL and GSL. The first interlayered insulating layer 460 may cover the top surface of the uppermost insulating pattern 230 and the top surfaces of the pads 330. The first interlayered insulating layer 460 may include, for example, a silicon oxide layer.

A second interlayered insulating layer 480 may be disposed on the first interlayered insulating layer 460. The second interlayered insulating layer 480 may cover a top surface of the first interlayered insulating layer 460. The second interlayered insulating layer 480 may include, for example, a silicon oxide layer. Channel contact plugs HCP may be disposed on each cell channel structure CH and each current control channel structure CCH. The channel contact plugs HCP may penetrate the second and first interlayered insulating layers 460 and 480, and may be in direct contact with the pads 330. The channel contact plugs HCP may include at least one of, for example, metal materials (e.g., copper or tungsten) and metal nitrides (e.g., TiN, TaN, or WIN).

The bitlines BL may be disposed on the second interlayered insulating layer 480. The bitlines BL may extend in second horizontal direction D2 in the cell string area CLAR and the contact area CTAR. The bitlines BL may be arranged to be spaced apart from each other in the first horizontal direction D1. Each bitline BL may be electrically connected to the cell channel structures CH and the current control channel structure CCH arranged along the second horizontal direction D2. The bitlines BL may include, for example, a metal material.

The charge storing structure 310 may be provided to enclose the side surface of the vertical channel portion 315 and may be interposed between the bottom surface of the vertical channel portion 315 and the semiconductor substrate 100. In this regard, the vertical channel portion 315 may be separated from the semiconductor substrate 100.

A source conductive pattern SCP may be disposed between the semiconductor substrate 100 and the buffer oxide layer 210. The source conductive pattern SCP may include a first source conductive pattern SCP1 and a second source conductive pattern SCP2. The second source conductive pattern SCP2 may be disposed on a top surface of the first source conductive pattern SCP1. The first source conductive pattern SCP1 may extend from a region between the semiconductor substrate 100 and the second source conductive pattern SCP2 to other regions between the second source conductive pattern SCP2 and the vertical channel portion 315 and between the semiconductor substrate 100 and the vertical channel portion 315. As illustrated in FIG. 21, due to the first source conductive pattern SCP1, the charge storing structure 310 may be divided into an upper charge storing structure 310a, which is placed on the first source conductive pattern SCP1, and a lower charge storing structure 310b, which is placed below the first source conductive pattern SCP1.

In some example embodiments, the first source conductive pattern SCP1 may include a horizontal portion PP and a vertical portion VP. The horizontal portion PP of the first source conductive pattern SCP1 may be disposed between the semiconductor substrate 100 and the second source conductive pattern SCP2. The vertical portion VP may extend from a region between the vertical channel portion 315 and the horizontal portion PP to other regions between the second source conductive pattern SCP2 and the vertical channel portion 315 and between the semiconductor substrate 100 and the vertical channel portion 315. The vertical portion VP may be in contact with the charge storing structure 310. A top surface of the vertical portion VP may be located at a vertical level between a top surface of the horizontal portion PP and a top surface of the second source conductive pattern SCP2. A bottom surface of the vertical portion VP may be located at a lower vertical level than the top surface of the semiconductor substrate 100. The first and second source conductive patterns SCP1 and SCP2 may be formed of a polysilicon layer, which is doped with impurities of the first conductivity type, and a concentration of impurities doped into the second source conductive pattern SCP2 may be higher than that in the first source conductive pattern SCP1. Such source conductive pattern SCP may be used as the above-described source line CSL.

According to example embodiments, the plurality of current control channel structures CCH may be formed in the contact area CTAR that is adjacent to the cell string area CLAR in the second horizontal direction D2. The plurality of current control channel structures CCH may be connected between the plurality of bitlines BL and the source line CSL. The current control channel structures CCH may include the current control transistors CTR, respectively. The current control line CGSL may be formed in the contact area CTAR to form the gate electrodes of the current control transistors CTR in the current control channel structures CCH.

In some example embodiments, as illustrated in FIGS. 19 and 20, one current control channel structure CCH may be connected to one bitline BL.

In some example embodiments, as illustrated in FIG. 20, the source line CSL may extend in the second horizontal direction D2 in the cell string area CLAR and the contact area CTAR without cutting. In this case the source line CSL may be connected commonly to the plurality of cell channel structures CH and the plurality of current control channel structures CCH. In this case, the source voltage Vs may be the ground voltage VSS during the read operation, and the ground voltage VSS may be simultaneously applied to the bottom portions of the cell channel structures CH and the current control channel structures CCH.

Figure 22:
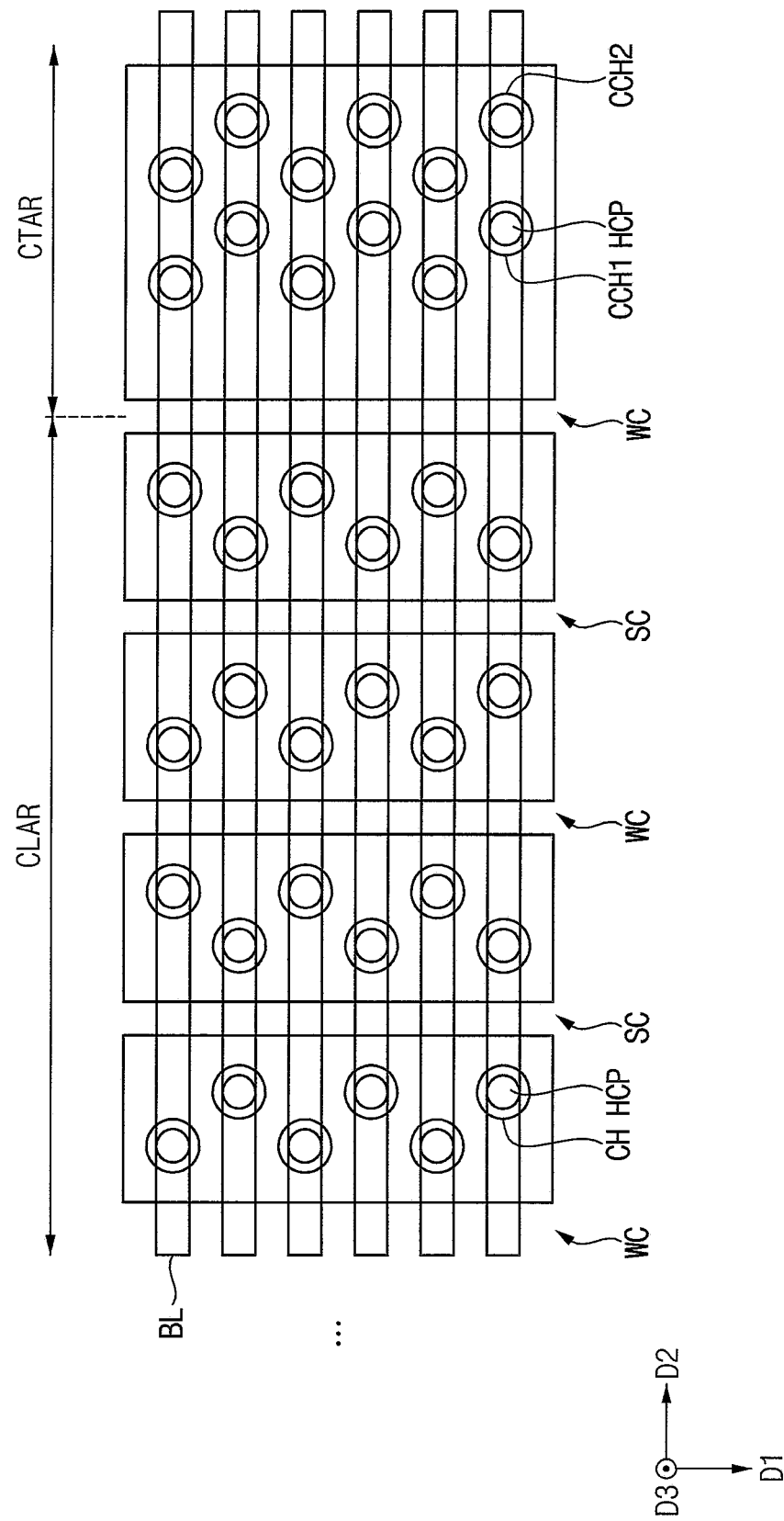
FIG. 22 is a plan view illustrating a nonvolatile memory device according to example embodiments.
Figure 23:
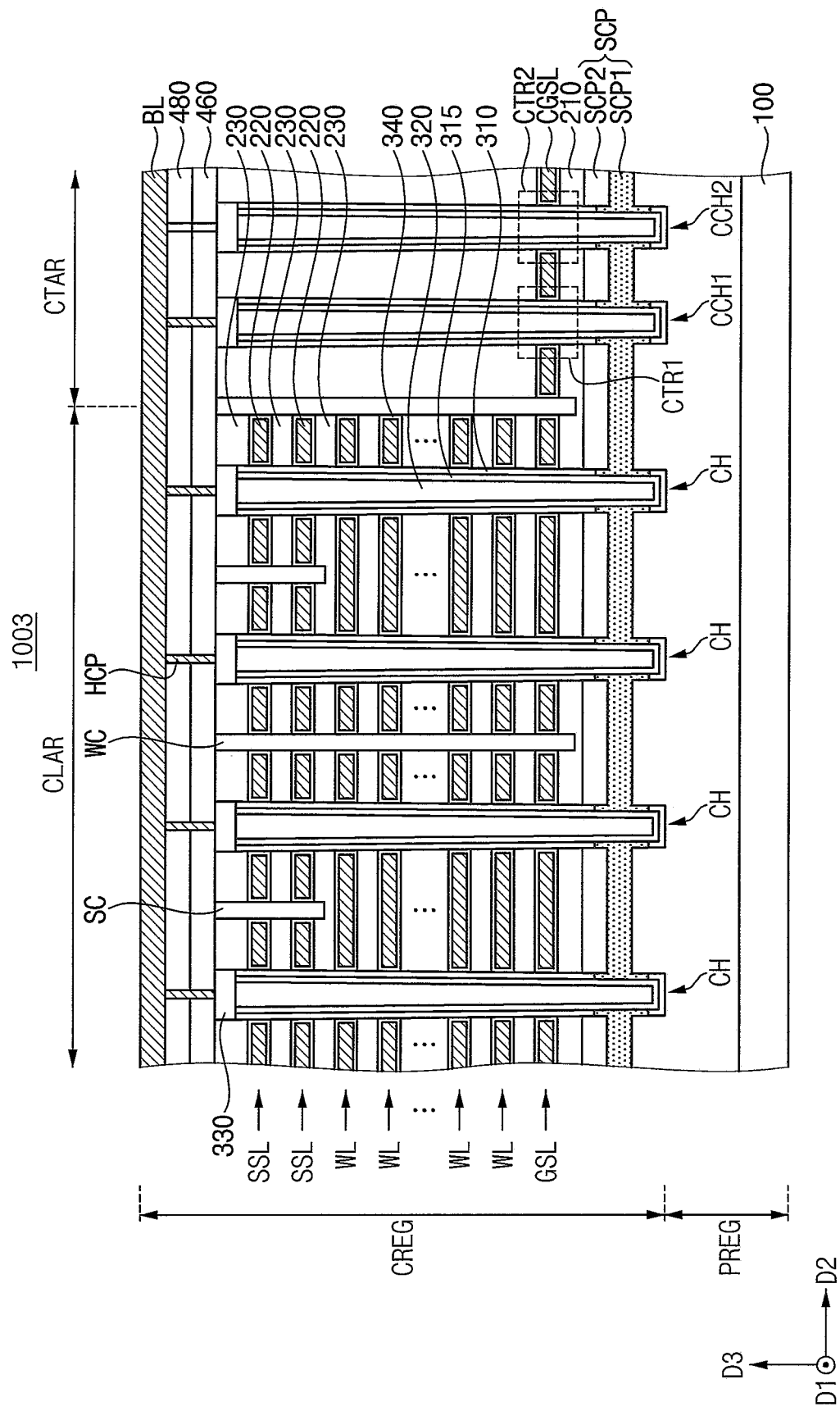
FIG. 23 is a cross-sectional diagram illustrating an example vertical structure of the nonvolatile memory device of FIG. 22.

FIG. 22 is a plan view illustrating a nonvolatile memory device according to example embodiments, and FIG. 23 is a cross-sectional diagram illustrating an example vertical structure of the nonvolatile memory device of FIG. 22. Hereinafter, descriptions repeated with FIGS. 18 through 21 are omitted, and only differences related with the current control transistor CTR will be described.

Referring to FIGS. 22 and 23, a nonvolatile memory device 1003 includes a current control line CGSL and a plurality of current control channel structures CCH, which are formed in the contact area CTAR that is adjacent to the cell string area CLAR in the second horizontal direction D2.

The plurality of current control channel structures CCH are connected between the plurality of bitlines BL and the source line CSL. The current control channel structures CCH include the current control transistors CTR, respectively. The current control line CGSL forms the gate electrodes of the current control transistors CTR in the current control channel structures CCH.

In some example embodiments, as illustrated in FIGS. 22 and 23, two or more current control channel structures CCH may be connected to one bitline BL. Even though FIGS. 22 and 23 illustrate the two current control channel structures CCH1 and CCH2 for convenience of illustration, example embodiments are not limited thereto and, for example, three or more current control channel structures may be connected to each bitline BL.

Figure 24:
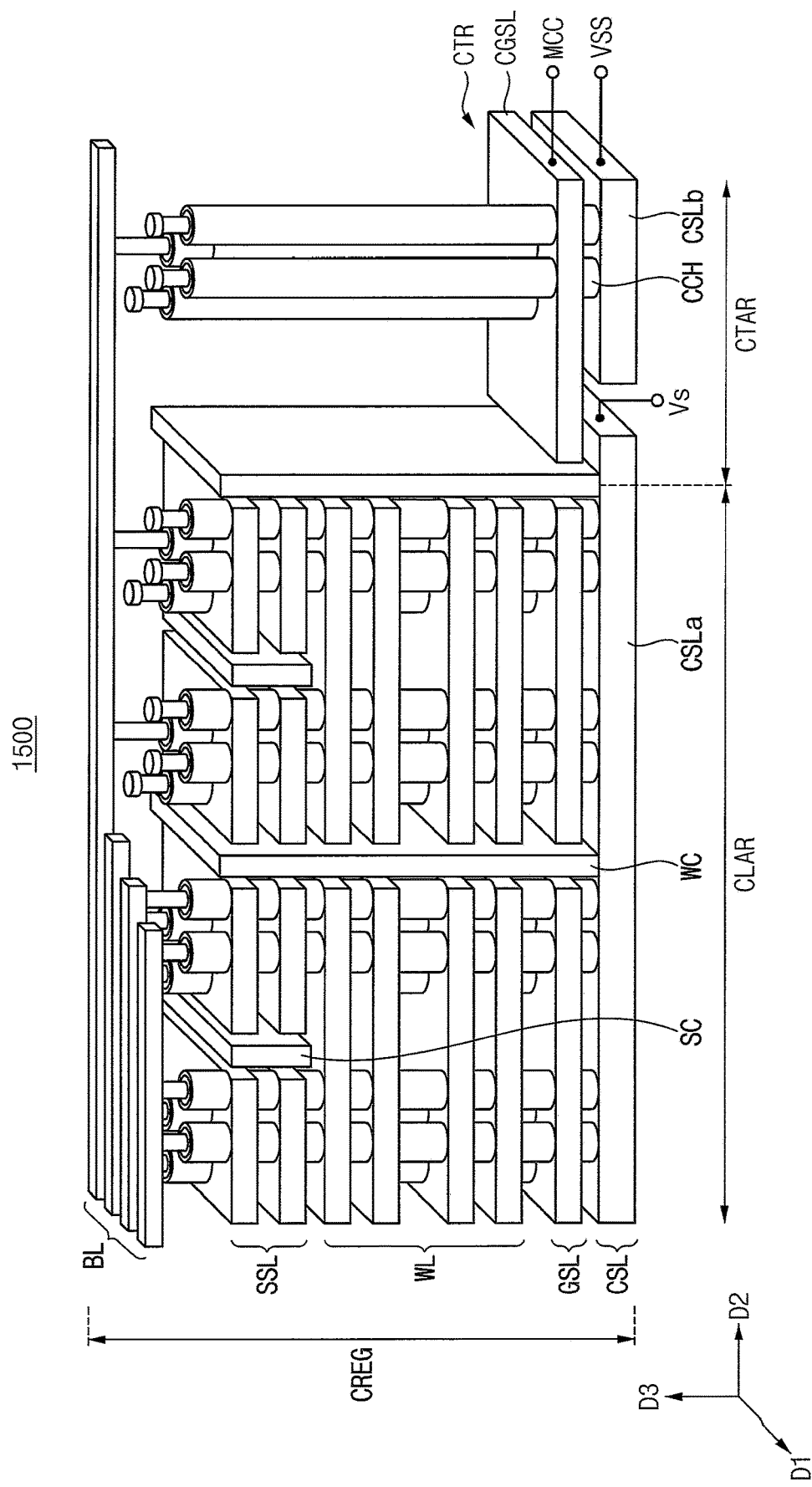
FIG. 24 is a perspective view illustrating a nonvolatile memory device according to example embodiments.
Figure 25:
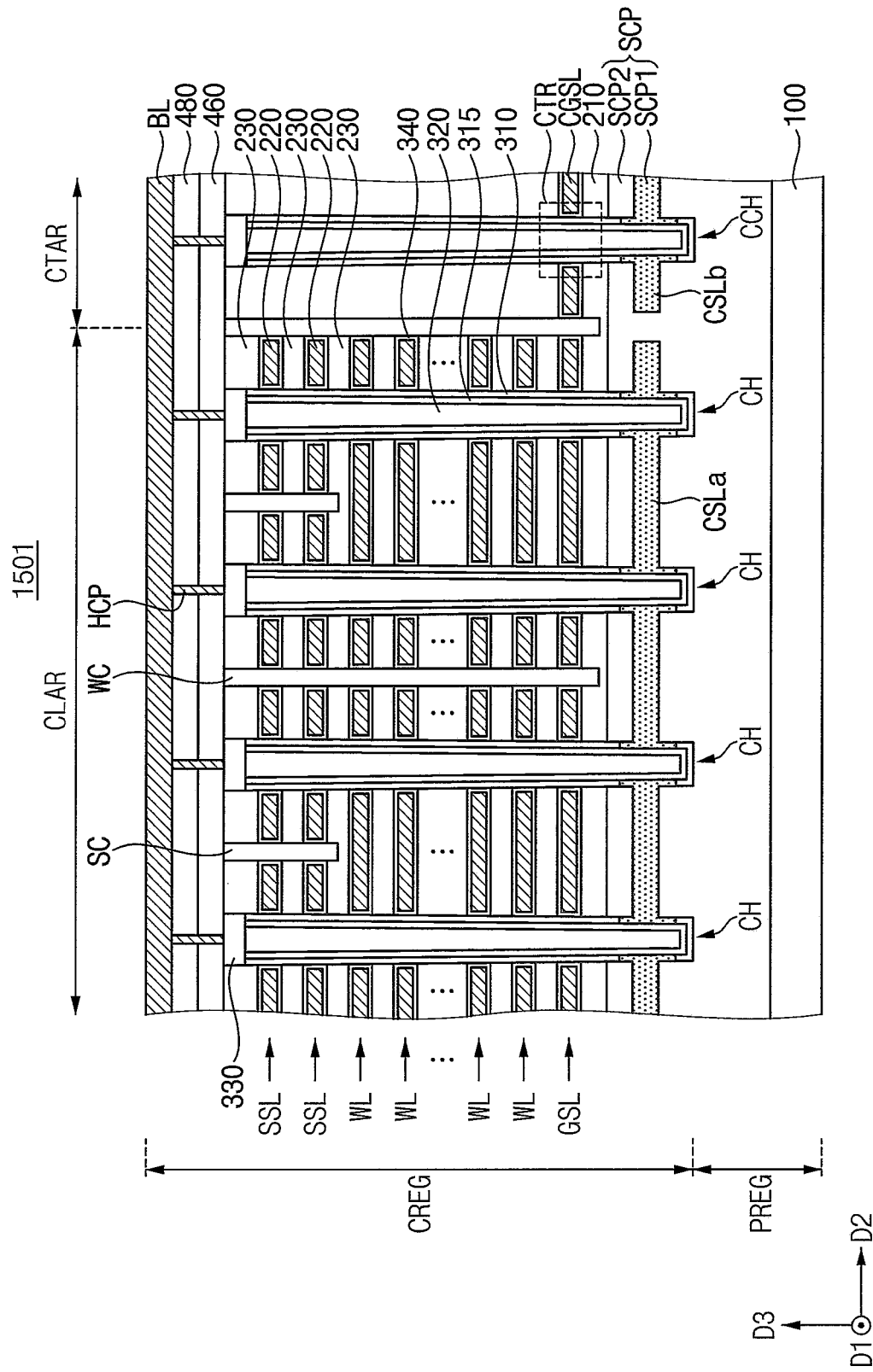
FIG. 25 is a cross-sectional diagram illustrating an example vertical structure of the nonvolatile memory device of FIG. 24.

FIG. 24 is a perspective view illustrating a nonvolatile memory device according to example embodiments, and FIG. 25 is a cross-sectional diagram illustrating an example vertical structure of the nonvolatile memory device of FIG. 24. Hereinafter, descriptions repeated with FIGS. 18 through 23 are omitted, and differences will be described.

Referring to FIGS. 24 and 25, a nonvolatile memory device 1500 may include a plurality of bitlines BL, at least one source line CSL, a plurality of cell channel structures CH, a gate electrode structure, a plurality of current control channel structures CCH and a current control line CGSL.

The plurality of bitlines BL may be disposed in a first end portion in a vertical direction D3 of a cell region CREG. The plurality of bitlines BL may be arranged in a first horizontal direction D1 and extend in a second horizontal direction D2.

The source line CSL may be disposed in a second end portion in the vertical direction D3 of the cell region CREG and extend in the second horizontal direction D2. In some example embodiments, the source line CSL may include a plurality of lines arranged in the first horizontal direction D1. In some example embodiments, as illustrated in FIG. 24, the source line CSL may be implemented as a common source line having a planar shape.

In some example embodiments, as illustrated in FIGS. 24 and 25, the source line CSL may be cut at the boundary between the cell string area CLAR and the contact area CTAR such that the source line CSL may be divided into a first source line segment CSLa and a second source line segment CSLb.

The first source line segment CSLa may be connected to the plurality of cell channel structures CH and the second source line segment CSLb may be connected to the plurality of current control channel structures CCH. Thus, during the read operation, a source voltage Vs applied to the plurality of cell channel structures CH may be controlled independently of a ground voltage VSS applied to the plurality of current control channel structures CCH. In this regard, voltage levels of the source voltage Vs and the ground voltage VSS may be different from each other, and/or the timing of applying the source voltage Vs and the ground voltage VSS may be different from each other.

The plurality of cell channel structures CH may be disposed in the cell string area CLAR of the cell region CREG and respectively connected between the plurality of bitlines BL and the source line CSL. As will be described below, each cell channel structure CH may include at least one string selection transistor, a plurality of memory cells and at least one ground selection transistor.

Figure 26:
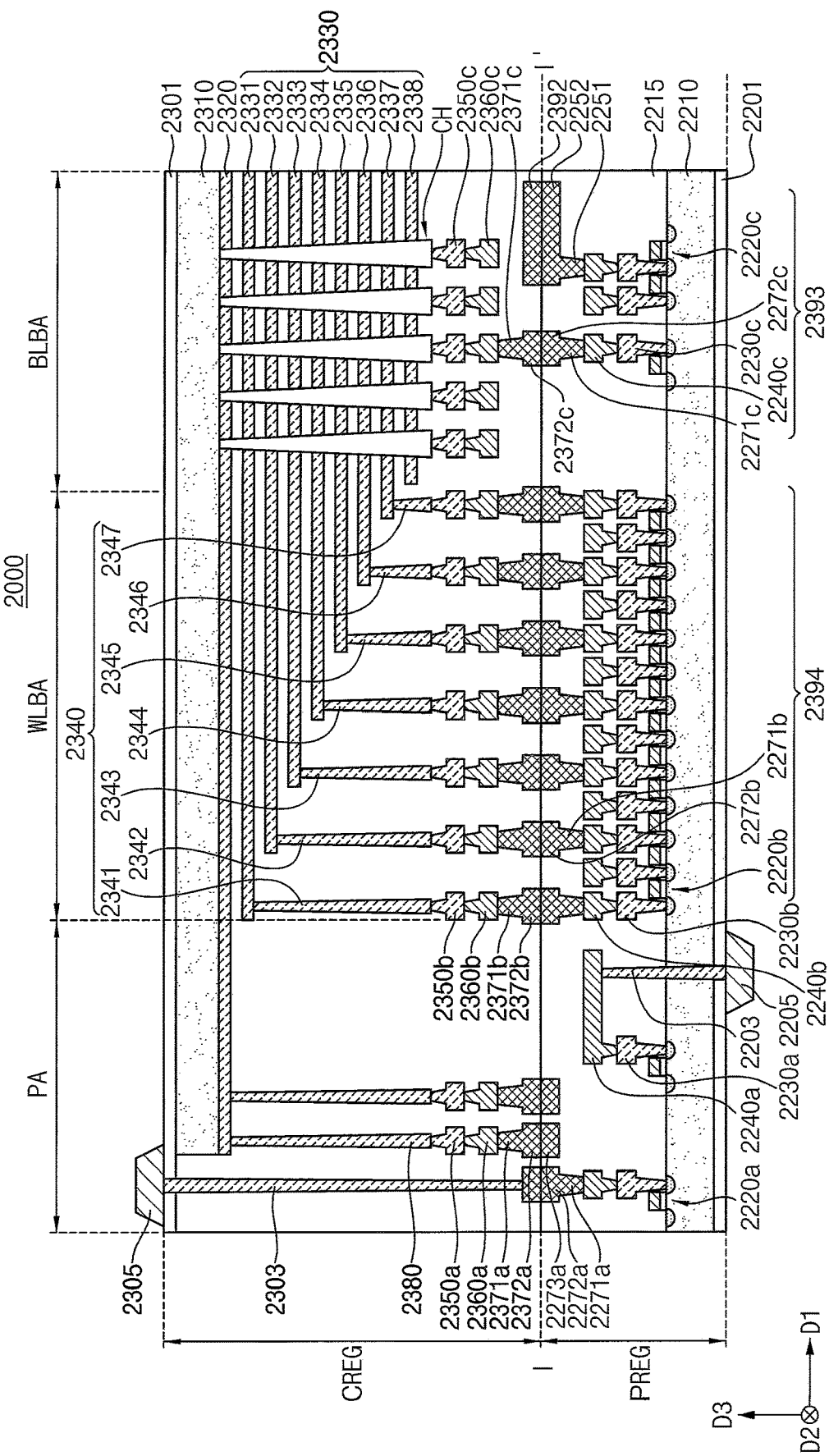
FIGS. 26 and 27 are cross-sectional diagrams illustrating a nonvolatile memory device according to example embodiments.
Figure 27:
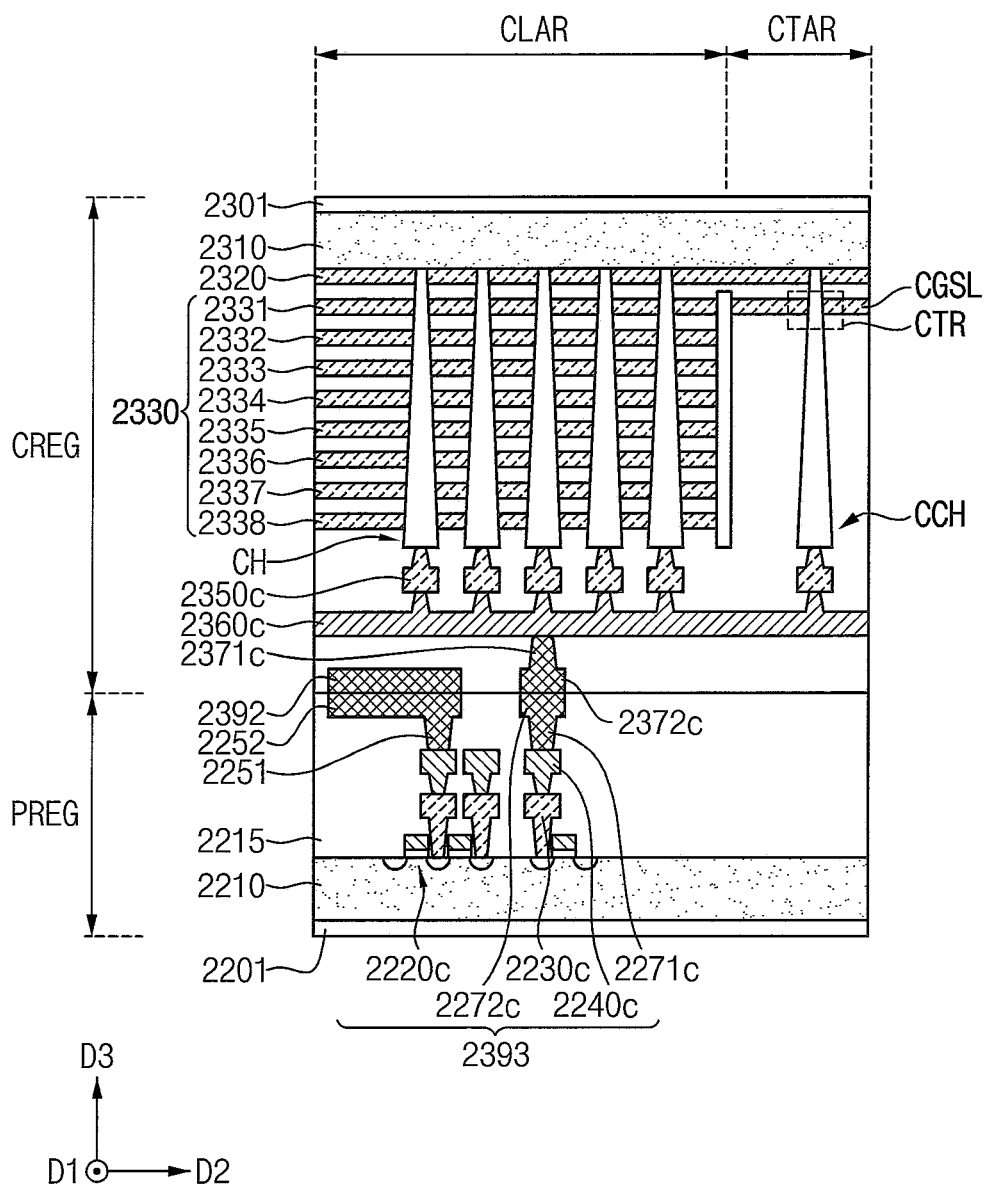

FIGS. 26 and 27 are cross-sectional diagrams illustrating a nonvolatile memory device according to example embodiments.

Referring to FIG. 26, a nonvolatile memory device or a memory device 2000 may have a chip-to-chip (C2C) structure. The C2C structure may refer to a structure formed by manufacturing an upper chip including a memory cell region or a cell region CREG on a first wafer, manufacturing a lower chip including a peripheral region PREG on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, the bonding metals may include copper (Cu) using a Cu-to-Cu bonding. Example embodiments, however, are not limited thereto. For example, the bonding metals may also be formed of aluminum (Al) or tungsten (W).

Each of the peripheral region PREG and the cell region CREG of the memory device 2000 may include an external pad bonding area PA, a wordline bonding area WLBA, and a bitline bonding area BLBA.

The peripheral region PREG may include a first substrate 2210, an interlayer insulating layer 2215, a plurality of circuit elements 2220a, 2220b, and 2220c formed on the first substrate 2210, first metal layers 2230a, 2230b, and 2230c respectively connected to the plurality of circuit elements 2220a, 2220b, and 2220c, and second metal layers 2240a, 2240b, and 2240c formed on the first metal layers 2230a, 2230b, and 2230c. In an example embodiment, the first metal layers 2230a, 2230b, and 2230c may be formed of a metal having a relatively high electrical resistivity, such as tungsten, and the second metal layers 2240a, 2240b, and 2240c may be formed of a metal having a relatively low electrical resistivity, such as copper.

Although only the first metal layers 2230a, 2230b, and 2230c and the second metal layers 2240a, 2240b, and 2240c are shown in FIG. 26, example embodiments are not limited thereto, and one or more additional metal layers may be further formed on the second metal layers 2240a, 2240b, and 2240c. At least a portion of the one or more additional metal layers formed on the second metal layers 2240a, 2240b, and 2240c may be formed of a metal, such as aluminum, having a lower electrical resistivity than the metal (e.g., copper) forming the second metal layers 2240a, 2240b, and 2240c.

The interlayer insulating layer 2215 may be disposed on the first substrate 2210 and cover the plurality of circuit elements 2220a, 2220b, and 2220c, the first metal layers 2230a, 2230b, and 2230c, and the second metal layers 2240a, 2240b, and 2240c. The interlayer insulating layer 2215 may include an insulating material such as silicon oxide, silicon nitride, or the like.

Lower bonding metals 2271b and 2272b may be formed on the second metal layer 2240b in the wordline bonding area WLBA. In the wordline bonding area WLBA, the lower bonding metals 2271b and 2272b in the peripheral region PREG may be electrically bonded to upper bonding metals 2371b and 2372b of the cell region CREG. The lower bonding metals 2271b and 2272b and the upper bonding metals 2371b and 2372b may be formed of aluminum, copper, tungsten, or the like. Further, the upper bonding metals 2371b and 2372b in the cell region CREG may be referred as first metal pads and the lower bonding metals 2271b and 2272b in the peripheral region PREG may be referred as second metal pads.

The cell region CREG may include at least one memory block. The cell region CREG may include a second substrate 2310 and a common source line 2320. On the second substrate 2310, a plurality of wordlines 2331, 2332, 2333, 2334, 2335, 2336, 2337, and 2338 (i.e., 2330) may be stacked in a vertical direction D3 (e.g., a Z-axis direction), perpendicular to an upper surface of the second substrate 2310. At least one string selection line and at least one ground selection line may be arranged on and below the plurality of wordlines 2330, respectively, and the plurality of wordlines 2330 may be disposed between the at least one string selection line and the at least one ground selection line.

In the bitline bonding area BLBA, a channel structure CH may extend in the vertical direction D3 (e.g., the Z-axis direction), perpendicular to the upper surface of the second substrate 2310, and pass through the plurality of wordlines 2330, the at least one string selection line, and the at least one ground selection line. The channel structure CH may include a data storage layer, a channel layer, a buried insulating layer, and the like, and the channel layer may be electrically connected to a first metal layer 2350c and a second metal layer 2360c. For example, the first metal layer 2350c may be a bitline contact, and the second metal layer 2360c may be a bitline. In an example embodiment, the bitline 2360*c* may extend in a second horizontal direction D2 (e.g., a Y-axis direction), parallel to the upper surface of the second substrate 2310.

In an example embodiment illustrated in FIG. 26, an area in which the channel structure CH, the bitline 2360*c*, and the like are disposed may be referred to as the bitline bonding area BLBA. In the bitline bonding area BLBA, the bitline 2360*c* may be electrically connected to the circuit elements 2220*c* providing a page buffer 2393 in the peripheral region PREG. The bitline 2360*c* may be connected to upper bonding metals 2371*c* and 2372*c* in the cell region CREG, and the upper bonding metals 2371*c* and 2372*c* may be connected to lower bonding metals 2271*c* and 2272*c* connected to the circuit elements 2220*c* of the page buffer 2393.

In the wordline bonding area WLBA, the plurality of wordlines 2330 may extend in a first horizontal direction D1 (e.g., an X-axis direction), parallel to the upper surface of the second substrate 2310 and perpendicular to the second horizontal direction D2, and may be connected to a plurality of cell contact plugs 2341, 2342, 2343, 2344, 2345, 2346, and 2347 (i.e., 2340). The plurality of wordlines 2330 and the plurality of cell contact plugs 2340 may be connected to each other in pads provided by at least a portion of the plurality of wordlines 2330 extending in different lengths in the first horizontal direction D1. A first metal layer 2350*b* and a second metal layer 2360*b* may be connected to an upper portion of the plurality of cell contact plugs 2340 connected to the plurality of wordlines 2330, sequentially. The plurality of cell contact plugs 2340 may be connected to the peripheral region PREG by the upper bonding metals 2371*b* and 2372*b* of the cell region CREG and the lower bonding metals 2271*b* and 2272*b* of the peripheral region PREG in the wordline bonding area WLBA.

The plurality of cell contact plugs 2340 may be electrically connected to the circuit elements 2220*b* forming a row decoder 2394 in the peripheral region PREG. In an example embodiment, operating voltages of the circuit elements 2220*b* forming the row decoder 2394 may be different than operating voltages of the circuit elements 2220*c* forming the page buffer 2393. For example, operating voltages of the circuit elements 2220*c* forming the page buffer 2393 may be greater than operating voltages of the circuit elements 2220*b* forming the row decoder 2394.

A common source line contact plug 2380 may be disposed in the external pad bonding area PA. The common source line contact plug 2380 may be formed of a conductive material, such as a metal, a metal compound, polysilicon, or the like, and may be electrically connected to the common source line 2320. A first metal layer 2350*a* and a second metal layer 2360*a* may be stacked on an upper portion of the common source line contact plug 2380, sequentially. For example, an area in which the common source line contact plug 2380, the first metal layer 2350*a*, and the second metal layer 2360*a* are disposed may be referred to as the external pad bonding area PA.

Input/output pads 2205 and 2305 may be disposed in the external pad bonding area PA. A lower insulating film 2201 covering a lower surface of the first substrate 2210 may be formed below the first substrate 2210, and a first input/output pad 2205 may be formed on the lower insulating film 2201. The first input/output pad 2205 may be connected to at least one of the plurality of circuit elements 2220*a*, 2220*b*, and 2220*c* disposed in the peripheral region PREG through a first input/output contact plug 2203, and may be separated from the first substrate 2210 by the lower insulating film 2201. In addition, a side insulating film may be disposed between the first input/output contact plug 2203 and the first substrate 2210 to electrically separate the first input/output contact plug 2203 and the first substrate 2210.

An upper insulating film 2301 covering the upper surface of the second substrate 2310 may be formed on the second substrate 2310, and a second input/output pad 2305 may be disposed on the upper insulating layer 2301. The second input/output pad 2305 may be connected to at least one of the plurality of circuit elements 2220*a*, 2220*b*, and 2220*c* disposed in the peripheral region PREG through a second input/output contact plug 2303. In an example embodiment, the second input/output pad 2305 is electrically connected to a circuit element 2220*a*.

According to embodiments, the second substrate 2310 and the common source line 2320 may not be disposed in an area in which the second input/output contact plug 2303 is disposed. Also, the second input/output pad 2305 may not overlap the wordlines 2330 in the vertical direction D3 (e.g., the Z-axis direction). The second input/output contact plug 2303 may be separated from the second substrate 2310 in the direction, parallel to the upper surface of the second substrate 310, and may pass through the interlayer insulating layer 2315 of the cell region CREG to be connected to the second input/output pad 2305.

According to example embodiments, the first input/output pad 2205 and the second input/output pad 2305 may be selectively formed. For example, the memory device 2000 may include only the first input/output pad 2205 disposed on the first substrate 2210 or the second input/output pad 2305 disposed on the second substrate 2310. Alternatively, the memory device 200 may include both the first input/output pad 2205 and the second input/output pad 2305.

A metal pattern provided on an uppermost metal layer may be provided as a dummy pattern or the uppermost metal layer may be absent, in each of the external pad bonding area PA and the bitline bonding area BLBA, respectively included in the cell region CREG and the peripheral region PREG.

In the external pad bonding area PA, the memory device 2000 may include a lower metal pattern 2273*a*, corresponding to an upper metal pattern 2372*a* formed in an uppermost metal layer of the cell region CREG, and having the same cross-sectional shape as the upper metal pattern 2372*a* of the cell region CREG so as to be connected to each other, in an uppermost metal layer of the peripheral region PREG. In the peripheral region PREG, the lower metal pattern 2273*a* formed in the uppermost metal layer of the peripheral region PREG may not be connected to a contact. Similarly, in the external pad bonding area PA, an upper metal pattern 2372*a*, corresponding to the lower metal pattern 2273*a* formed in an uppermost metal layer of the peripheral region PREG, and having the same shape as a lower metal pattern 2273*a* of the peripheral region PREG, may be formed in an uppermost metal layer of the cell region CREG.

The lower bonding metals 2271*b* and 2272*b* may be formed on the second metal layer 2240*b* in the wordline bonding area WLBA. In the wordline bonding area WLBA, the lower bonding metals 2271*b* and 2272*b* of the peripheral region PREG may be electrically connected to the upper bonding metals 2371*b* and 2372*b* of the cell region CREG by a Cu-to-Cu bonding.

Further, in the bitline bonding area BLBA, an upper metal pattern 2392, corresponding to a lower metal pattern 2252 formed in the uppermost metal layer of the peripheral region PREG, and having the same cross-sectional shape as the lower metal pattern 2252 of the peripheral region PREG, may be formed in an uppermost metal layer of the cell region CREG. A contact may not be formed on the upper metal pattern 2392 formed in the uppermost metal layer of the cell region CREG.

As illustrated in FIG. 27, according to example embodiments, the nonvolatile memory device 2000 may include a current control line CGSL and a plurality of current control channel structures CCH, which are formed in the contact area CTAR that is adjacent to the cell string area CLAR in the second horizontal direction D2.

The plurality of current control channel structures CCH may be connected between the plurality of bitlines BL and the source line CSL. The current control channel structures CCH may include the current control transistors CTR, respectively. The current control line CGSL may form the gate electrodes of the current control transistors CTR in the current control channel structures CCH.

As such, the nonvolatile memory device 2000 according to example embodiments may reduce the size of the page buffer circuit and the nonvolatile memory device 2000 including the page buffer circuit by removing the current control transistor CTR to generate the above-described control current ICON from the page buffer circuit and implementing the current control transistor CTR using the current control channel structure CCH.

Figure 28:
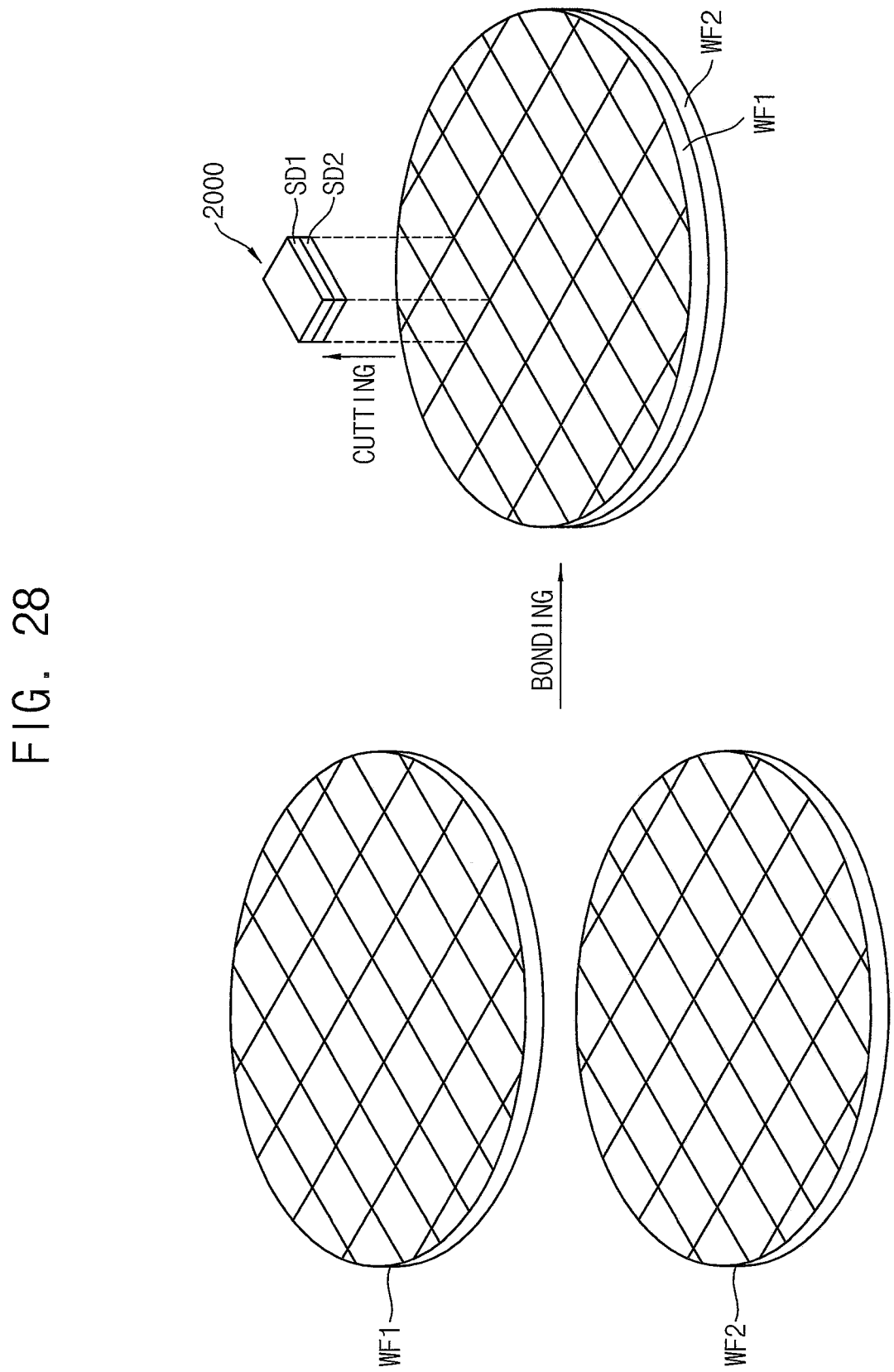
FIG. 28 is a conceptual diagram illustrating manufacturing processes of a stacked memory device according to example embodiments.

FIG. 28 is a conceptual diagram illustrating manufacturing processes of a stacked memory device according to example embodiments.

Referring to FIG. 28, respective integrated circuits may be formed in a first wafer WF1 and a second wafer WF2. The above-described memory cell array and current control transistors CTR using the current control channel structures CCH may be formed in the first wafer WF1 and the peripheral circuits may be formed in the second wafer WF2.

After the integrated circuits are formed in the first and second wafers WF1 and WF2, the first wafer WF1 and the second wafer WF2 may be bonded. The bonded wafers WF1 and WF2 are cut and divided into a plurality of chips where each chip corresponds to a semiconductor device 2000 including a first semiconductor die SD1 and a second semiconductor die SD2 that are stacked vertically (e.g., the first semiconductor die SD1 is stacked on the second semiconductor die SD2, etc.). Each cut portion of the first wafer WF1 corresponds to the first semiconductor die SD1 and each cut portion of the second wafer WF2 corresponds to a second semiconductor die SD2.

Figure 29:
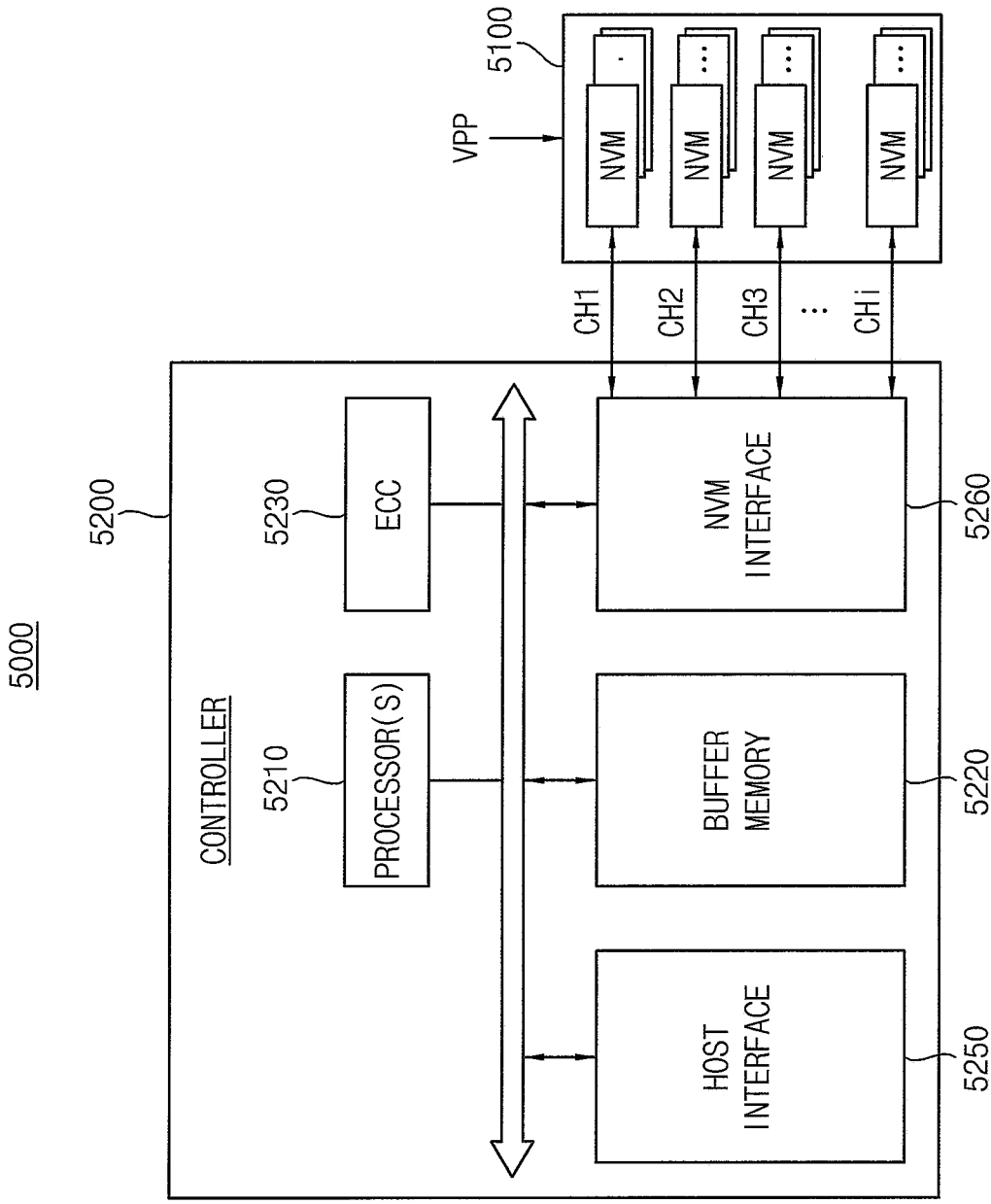
FIG. 29 is a block diagram illustrating a solid state disk or solid state drive (SSD) according to example embodiments.

FIG. 29 is a block diagram illustrating a solid state disk or solid state drive (SSD) according to example embodiments.

Referring to FIG. 29, an SSD 5000 includes nonvolatile memory devices 5100 and an SSD controller 5200.

The nonvolatile memory devices 5100 may be configured optionally to receive a high voltage VPP. The nonvolatile memory devices 5100 may the above-described memory devices according to example embodiments. The nonvolatile memory devices 5100 may include current control transistor to increase the bitline current during the precharge period of the read operation.

The SSD controller 5200 is connected to the nonvolatile memory devices 5100 through multiple channels CH1 to CHi. The SSD controller 1200 includes one or more processors 5210, a buffer memory 5220, an error correction code (ECC) circuit 5230, a host interface 5250, and a nonvolatile memory interface 1260. The buffer memory 5220 stores data used to drive the SSD controller 5200. The buffer memory 5220 includes multiple memory lines each storing data or a command. The ECC circuit 5230 calculates error correction code values of data to be programmed at a writing operation and corrects an error of read data using an error correction code value at a read operation. In a data recovery operation. The ECC circuit 5230 corrects an error of data recovered from the nonvolatile memory devices 5100.

As described above, the nonvolatile memory device and the method according to example embodiments may reduce the precharge time by generating the control current flowing from the bitline to the sink node to increase the bitline current. The precharge time may be reduced without an additional operation to determine whether the selected memory cell is an on cell or an off cell by generating the control current to all of the bitlines.

In addition, the nonvolatile memory device and the method according to example embodiments may reduce the develop time for which the sensing node is discharged, by increasing the bitline current. The control current may be changed during the precharge period based on factors of affecting the cell current such as the temperature and the position of the selected memory cell, and the develop time may be adjusted to decrease the deviation of the bitline current.

The entire read time may be reduced and the performance of the nonvolatile memory device may be enhanced by reducing the precharge time and the develop time. In addition, the performance deviation of the nonvolatile memory device may be reduced by reducing the deviation of the bitline current.

The present inventive concept may be applied to nonvolatile memory devices and systems including the nonvolatile memory device. For example, the present inventive concept may be applied to systems such as be a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

In some example embodiments, each of the components represented by a block, such as those illustrated in FIGS. 3 and 29, may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A nonvolatile memory device comprising:
a bitline;
a precharge transistor configured to electrically connect the bitline to a power supply voltage during a precharge period of a read operation to transmit a bitline current flowing from the power supply voltage to the bitline;
a cell string connected between the bitline and a source line, the cell string comprising a plurality of memory cells and being configured to transmit a first portion of the bitline current as a cell current; and
a current control switch circuit connected between the bitline and a sink node, the current control switch circuit being configured to transmit a second portion of the bitline current as a control current flowing from the bitline to the sink node during the precharge period regardless of whether a threshold voltage of a selected memory cell is higher than a read voltage of the selected memory cell.

2. The nonvolatile memory device of claim 1, wherein the current control switch circuit is further configured to transmit the control current during the precharge period regardless of whether the selected memory cell is an on cell or an off cell at a time point of the precharge transistor being activated at a start of the precharge period of the read operation.

3. The nonvolatile memory device of claim 1, wherein the current control switch circuit comprises:
an N-type metal oxide semiconductor (NMOS) transistor connected between the bitline and the sink node, and configured to control a magnitude of the control current based on a current control signal applied to a gate electrode of the NMOS transistor.

4. The nonvolatile memory device of claim 3, wherein the current control signal is continuously activated during the precharge period.

5. The nonvolatile memory device of claim 3, wherein the current control signal is a pulse signal comprising pulses that are periodically activated during the precharge period.

6. The nonvolatile memory device of claim 1, wherein the current control switch circuit comprises:
a first NMOS transistor connected between the bitline and the sink node, and comprising a gate electrode and a drain electrode that are electrically connected to each other; and
a second NMOS transistor cascode-connected to the first NMOS transistor between the bitline and the sink node and configured to control a magnitude of the control current based on a current control signal applied to a gate electrode of the second NMOS transistor.

7. The nonvolatile memory device of claim 1, further comprising:
a cell region in which the cell string is disposed; and
a peripheral region in which the precharge transistor and the current control switch circuit are disposed,
wherein the nonvolatile memory device has a cell over periphery (COP) structure in which the cell region and the peripheral region are stacked in a vertical direction.

8. The nonvolatile memory device of claim 1, further comprising:
a develop transistor configured to electrically connect the bitline to a sensing node during a develop period after the precharge period; and
a sense amplifier connected to the sensing node,
wherein the precharge transistor and the current control switch circuit are configured to transmit the bitline current and the control current during the precharge period and the develop period.

9. The nonvolatile memory device of claim 1, further comprising:
a cell region comprising a cell string area in which the cell string is disposed and a contact area adjacent to the cell string area in a horizontal direction;
a peripheral region in which the precharge transistor is disposed; and
a current control channel structure disposed in the contact area and connected between the bitline and the source line,
wherein the nonvolatile memory device has a cell over periphery (COP) structure in which the cell region and the peripheral region are stacked in a vertical direction, and
wherein the current control switch circuit is provided in the current control channel structure.

10. The nonvolatile memory device of claim 9, wherein the source line comprises a first source line segment and a second source line segment separated from each other a boundary of the cell string area and the contact area.

11. The nonvolatile memory device of claim 10, wherein the first source line segment is connected to the cell string and the second source line segment is connected to the current control channel structure.

12. The nonvolatile memory device of claim 1, wherein the sink node corresponds to the source line and a ground voltage is applied to the source line during the read operation.

13. A method of controlling a read operation of a nonvolatile memory device, comprising:
controlling a bitline current to flow from a power supply voltage to a bitline by electrically connecting the bitline to the power supply voltage during a precharge period of the read operation;
controlling a first portion of the bitline current, as a cell current, to flow through a cell string connected between the bitline and a source line during the precharge period;
controlling a second portion of the bitline current, as a control current, to flow through a current control switch circuit connected between the bitline and a sink node during the precharge period;
electrically connecting the bitline to a sensing node during a develop period after the precharge period; and
sensing data stored in a selected memory cell of the cell string using a sense amplifier connected to the sensing node during a sensing period after the develop period.

14. The method of claim 13, wherein during the precharge period, the control current flows through the current control switch circuit regardless of whether the selected memory cell is an on cell or an off cell.

15. The method of claim 13, further comprising controlling the control current to flow during the precharge period and the develop period based on a signal that is continuously activated during the precharge period and the develop period.

16. The method of claim 13, further comprising controlling the control current to flow during the precharge period and the develop period based on a pulse signal comprising pulses that are periodically activated during the precharge period and the develop period.

17. A nonvolatile memory device comprising:
a plurality of bitlines;
a plurality of precharge transistors configured to electrically connect the plurality of bitlines to a power supply voltage during a precharge period of a read operation to transmit a plurality of bitline currents respectively flowing from the power supply voltage to the plurality of bitlines;
a plurality of cell strings respectively connected between the plurality of bitlines and a source line, the plurality of cell strings respectively comprising a plurality of memory cells and being configured to respectively transmit, respectively, first portions of the plurality of bitline currents as a plurality of cell currents; and
a plurality of current control switch circuits respectively connected between the plurality of bitlines and a sink node, the plurality of current control switch circuits being configured to respectively transmit, respectively, second portions of the plurality of bitline currents, as a plurality of control currents flowing from the plurality of bitlines to the sink node during the precharge period.

18. The nonvolatile memory device of claim 17, wherein the plurality of current control switch circuits are further configured to transmit the plurality of control currents during the precharge period regardless of whether a selected memory cell among the plurality of memory cells is an on cell or an off cell.

19. The nonvolatile memory device of claim 17, wherein the plurality of current control switch circuits are further configured to transmit the plurality of control currents based on a single current control signal.

20. The nonvolatile memory device of claim 17, wherein the plurality of current control switch circuits are further configured to transmit the plurality of control currents respectively based on a plurality of current control signals having different voltage levels.

* * * * *